(12) United States Patent
Lee et al.

(10) Patent No.: US 12,306,464 B2
(45) Date of Patent: May 20, 2025

(54) LENS ASSEMBLY

(71) Applicants: Sintai Optical (Shenzhen) Co., Ltd., ShenZhen (CN); Asia Optical Co., Inc., Taichung (TW)

(72) Inventors: Jian-Wei Lee, Taichung (TW); Shu-Hung Lin, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 757 days.

(21) Appl. No.: 17/491,574

(22) Filed: Oct. 1, 2021

(65) Prior Publication Data
US 2022/0137332 A1    May 5, 2022

(30) Foreign Application Priority Data
Nov. 2, 2020  (CN) .......................... 202011201306.5

(51) Int. Cl.
| | | |
|---|---|---|
| *G02B 9/10* | (2006.01) | |
| *G02B 9/64* | (2006.01) | |
| *G02B 13/18* | (2006.01) | |

(52) U.S. Cl.
CPC ................. *G02B 9/10* (2013.01); *G02B 9/64* (2013.01); *G02B 13/18* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 6,833,964 B2 | 12/2004 | Mizuguchi et al. | |
| 11,841,549 B2* | 12/2023 | Bao | G02B 9/64 |
| 2019/0187442 A1* | 6/2019 | Jia | G02B 9/64 |
| 2021/0011258 A1* | 1/2021 | Gao | G02B 9/64 |
| 2021/0096328 A1* | 4/2021 | Wang | G02B 13/004 |

FOREIGN PATENT DOCUMENTS

| | | |
|---|---|---|
| CN | 109445077 A | 3/2019 |
| CN | 109960020 A | 7/2019 |
| CN | 110133828 A | 8/2019 |
| JP | 2003015035 A | 1/2003 |
| JP | 2014102291 A | 6/2014 |

* cited by examiner

*Primary Examiner* — Christopher Stanford
(74) *Attorney, Agent, or Firm* — McClure, Qualey & Rodack, LLP

(57) ABSTRACT

A lens assembly includes a first, second, third, stop, fourth, fifth, sixth, and seventh in order from an object side to an image side along an optical axis. The first lens is a meniscus lens with refractive power and includes a convex surface facing the object side and a concave surface facing the image side. The second lens is with negative refractive power. The third lens is with positive refractive power and includes a convex surface facing the image side. The fourth lens is with refractive power and includes a convex surface facing the image side. The fifth lens is with positive refractive power and includes a convex surface facing the object side. The sixth lens is a biconcave lens with negative refractive power. The seventh lens is with refractive power and includes a convex surface facing the image side. The lens assembly satisfies: $4.3 \leq TTL/BFL \leq 5.3$.

17 Claims, 20 Drawing Sheets

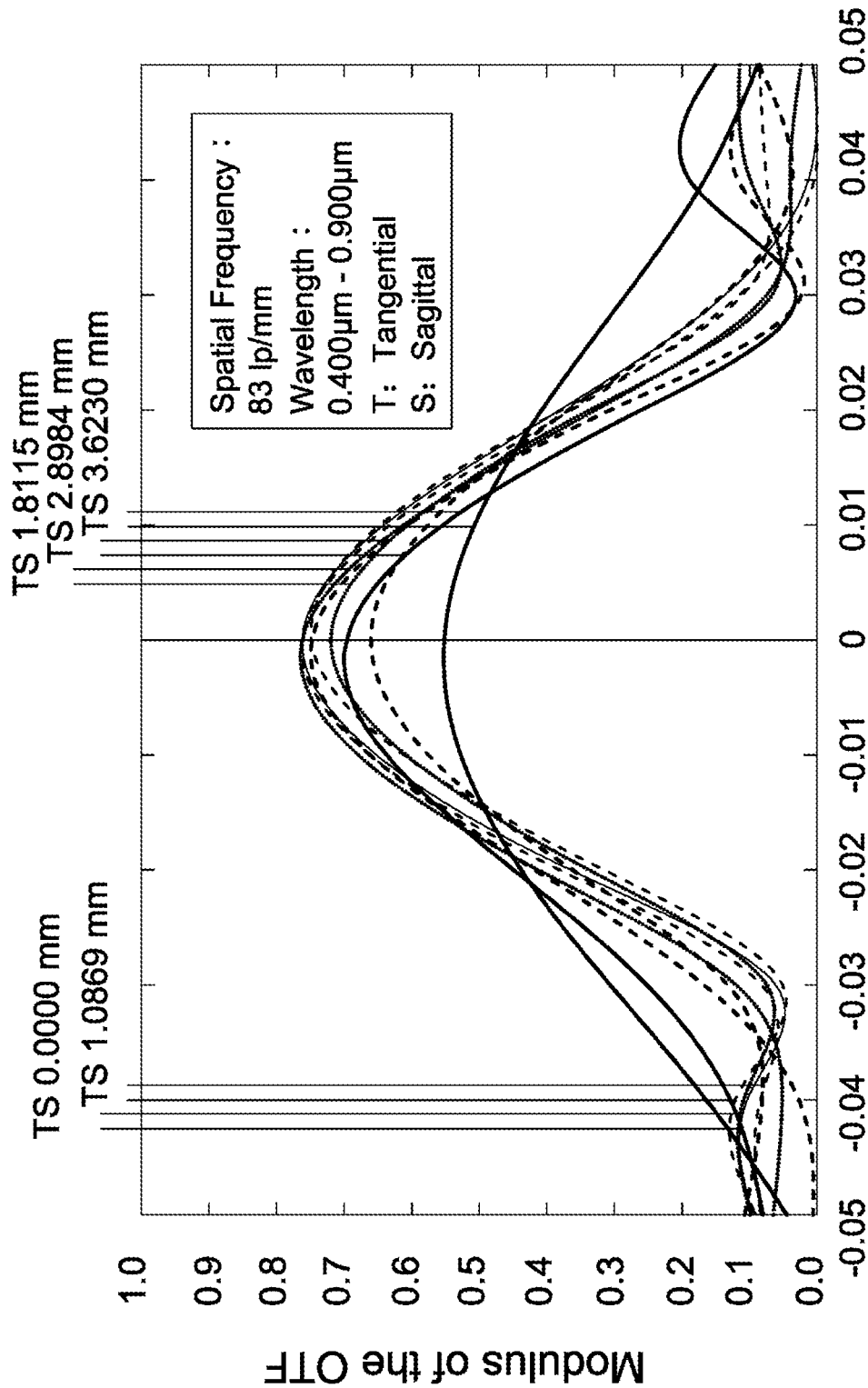

LENS ASSEMBLY

BACKGROUND OF THE INVENTION

Field of the Invention

The invention relates to a lens assembly.

Description of the Related Art

The current development trend of a lens assembly is toward large stop, high resolution, and resistance to environmental temperature change. In addition, it should also have the feature of day and night with the same focus, whether day or night to capture clear images, in order to meet the requirements of both day and night image quality. However, the known lens assembly can't satisfy such requirements. Therefore, the lens assembly needs a new structure in order to meet the requirements of large stop, high resolution, resistance to environmental temperature change, and with the same focus while day and night at the same time.

BRIEF SUMMARY OF THE INVENTION

The invention provides a lens assembly to solve the above problems. The lens assembly of the invention is provided with characteristics of a decreased f-number, a higher resolution, a resisted environmental temperature change, a same focus while day and night, and still has a good optical performance.

The lens assembly in accordance with an exemplary embodiment of the invention includes a first lens, a second lens, a third lens, a stop, a fourth lens, a fifth lens, a sixth lens, and a seventh lens, all of which are arranged in order from an object side to an image side along an optical axis. The first lens is a meniscus lens with refractive power, and includes a convex surface facing the object side and a concave surface facing the image side. The second lens is with negative refractive power. The third lens is with positive refractive power and includes a convex surface facing the image side. The fourth lens is with refractive power and includes a convex surface facing the image side. The fifth lens is with positive refractive power and includes a convex surface facing the object side. The sixth lens is a biconcave lens with negative refractive power, and includes a concave surface facing the object side and another concave surface facing the image side. The seventh lens is with refractive power and includes a convex surface facing the image side. The lens assembly satisfies: $4.3 \leq TTL/BFL \leq 5.3$; wherein TTL is an interval in mm from an object side surface of the first lens to an image plane along the optical axis and BFL is an interval in mm from an image side surface of the seventh lens to the image plane along the optical axis.

The lens assembly in accordance with another exemplary embodiment of the invention includes a first lens, a second lens, a third lens, a stop, a fourth lens, a fifth lens, a sixth lens, and a seventh lens, all of which are arranged in order from an object side to an image side along an optical axis. The first lens is a meniscus lens with refractive power, and includes a convex surface facing the object side and a concave surface facing the image side. The second lens is with negative refractive power and includes a concave surface facing the image side. The third lens is with positive refractive power and includes a convex surface facing the image side. The fourth lens is with refractive power and includes a convex surface facing the image side. The fifth lens is with positive refractive power and includes a convex surface facing the object side. The sixth lens is a biconcave lens with negative refractive power, and includes a concave surface facing the object side and another concave surface facing the image side. The seventh lens is with refractive power and includes a convex surface facing the image side. The lens assembly satisfies: $-1 \leq (R_{41}+R_{42})/(R_{41}-R_{42}) \leq 0$; wherein $R_{41}$ is a radius of curvature of the object side surface of the fourth lens and $R_{42}$ is a radius of curvature of the image side surface of the fourth lens.

In another exemplary embodiment, the first lens is with negative refractive power, the fourth lens is with positive refractive power and further includes another convex surface facing the object side, the fifth lens further includes another convex surface facing the image side, and the seventh lens is with positive refractive power and further includes another convex surface facing the object side.

In yet another exemplary embodiment, the second lens includes a concave surface facing the object side.

In another exemplary embodiment, the second lens includes a convex surface facing the object side.

In yet another exemplary embodiment, the third lens further includes another convex surface facing the object side.

In another exemplary embodiment, the third lens includes a concave surface facing the object side.

In yet another exemplary embodiment, the fifth lens and the sixth lens are cemented.

In another exemplary embodiment, the seventh lens is an aspheric lens.

In yet another exemplary embodiment, the lens assembly satisfies at least one of the following conditions: $8.5 \leq TTL/f \leq 11.5$; $-3.5 \leq f_1/f \leq -2.4$; $3 \leq f_3/f \leq 6$; $2.5 \leq f_7/f \leq 5.2$; $17.4 \text{ mm} \leq f + f_3 \leq 23.8 \text{ mm}$; wherein TTL is an interval in mm from an object side surface of the first lens to an image plane along the optical axis, f is an effective focal length in mm of the lens assembly, $f_1$ is an effective focal length in mm of the first lens, $f_3$ is an effective focal length in mm of the third lens, and $f_7$ is an effective focal length in mm of the seventh lens.

In another exemplary embodiment, the third lens includes a plane surface facing the object side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 8D is a through focus modulation transfer function diagram of the lens assembly in accordance with the fourth embodiment of the invention.

DETAILED DESCRIPTION OF THE INVENTION

Figure 1:
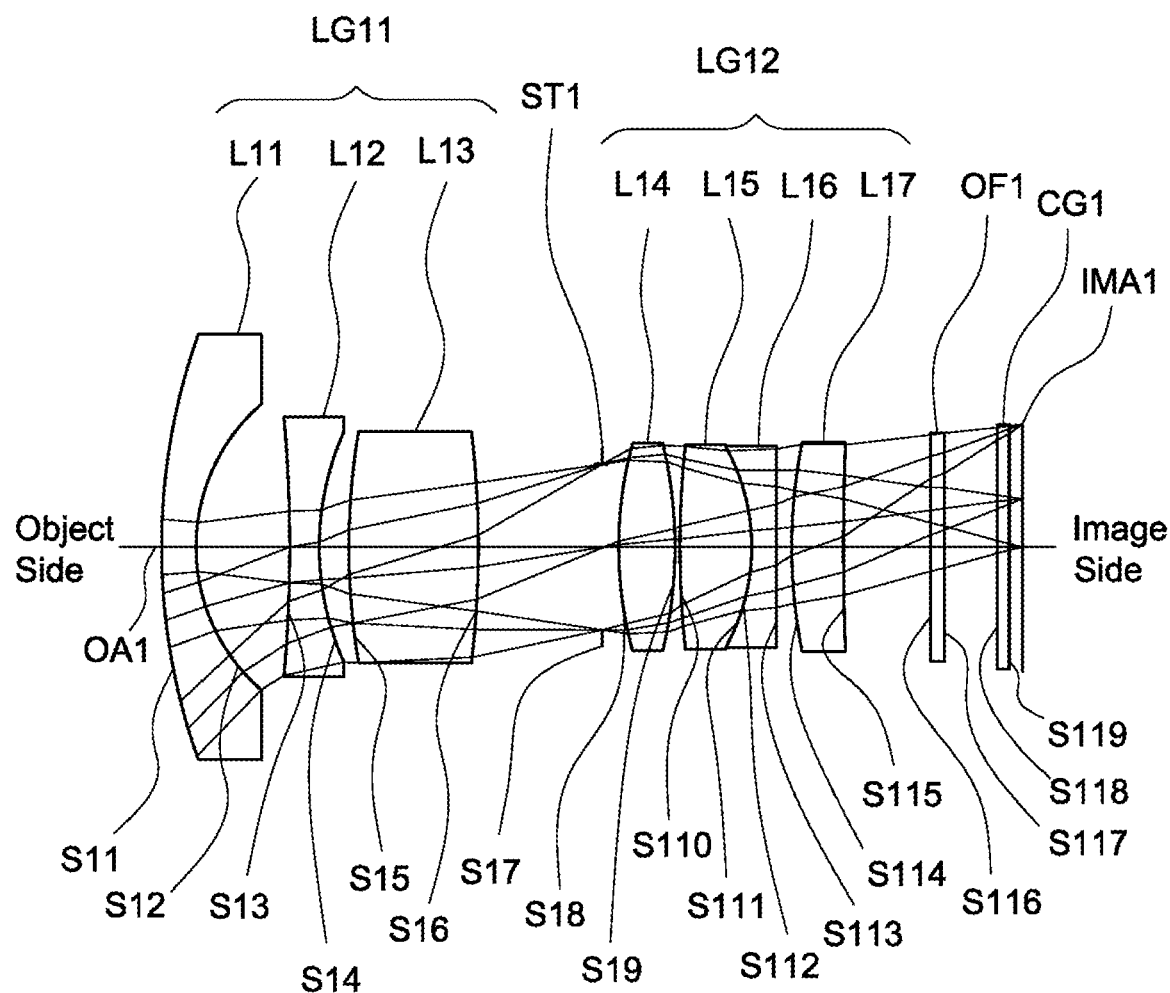
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a stop, a fourth lens, a fifth lens, a sixth lens, and a seventh lens. The first lens is a meniscus lens with refractive power, and includes a convex surface facing the object side and a concave surface facing the image side. The second lens is with negative refractive power. The third lens is with positive refractive power and includes a convex surface facing the image side. The fourth lens is with refractive power and includes a convex surface facing the image side. The fifth lens is with positive refractive power and includes a convex surface facing the object side. The sixth lens is a biconcave lens with negative refractive power, and includes a concave surface facing the object side and another concave surface facing the image side. The seventh lens is with refractive power and includes a convex surface facing the image side. The first lens, the second lens, the third lens, the stop, the fourth lens, the fifth lens, the sixth lens, and the seventh lens are arranged in order from the object side to the image side along an optical axis. The lens assembly satisfies: 4.3≤TTL/BFL≤5.3; wherein TTL is an interval in mm from an object side surface of the first lens to an image plane along the optical axis and BFL is an interval in mm from an image side surface of the seventh lens to the image plane along the optical axis.

The present invention provides another lens assembly including a first lens, a second lens, a third lens, a stop, a fourth lens, a fifth lens, a sixth lens, and a seventh lens. The first lens is a meniscus lens with refractive power, and includes a convex surface facing the object side and a concave surface facing the image side. The second lens is with negative refractive power and includes a concave surface facing the image side. The third lens is with positive refractive power and includes a convex surface facing the image side. The fourth lens is with refractive power and includes a convex surface facing the image side. The fifth lens is with positive refractive power and includes a convex surface facing the object side. The sixth lens is a biconcave lens with negative refractive power, and includes a concave surface facing the object side and another concave surface facing the image side. The seventh lens is with refractive power and includes a convex surface facing the image side. The first lens, the second lens, the third lens, the stop, the fourth lens, the fifth lens, the sixth lens, and the seventh lens are arranged in order from the object side to the image side along an optical axis. The lens assembly satisfies: $-1 \leq (R_{41}+R_{42})/(R_{41}-R_{42}) \leq 0$; wherein $R_{41}$ is a radius of curvature of the object side surface of the fourth lens and $R_{42}$ is a radius of curvature of the image side surface of the fourth lens.

Referring to Table 1, Table 2, Table 4, Table 5, Table 7, Table 8, Table 10, and Table 11, wherein Table 1, Table 4, Table 7, and Table 10 show optical specification in accordance with a first, second, third and fourth embodiments of the invention respectively and Table 2, Table 5, Table 8, and Table 11 show aspheric coefficient of each aspheric lens in Table 1, Table 4, Table 7, and Table 10 respectively.

FIG. 1, FIG. 3, FIG. 5, and FIG. 7 are lens layout and optical path diagrams of the lens assembly in accordance with the first, second, third, and fourth embodiments of the invention respectively. The first lens group LG11, LG21, LG31, LG41 including a first lens L11, L21, L31, L41, a second lens L12, L22, L32, L42, and a third lens L13, L23, L33, L43. The second lens group LG12, LG22, LG32, LG42 including a fourth lens L14, L24, L34, L44, a fifth lens L15, L25, L35, L45, a sixth lens L16, L26, L36, L46, and a seventh lens L17, L27, L37, L47.

The first lens L11, L21, L31, L41 are meniscus lenses with negative refractive power and made of glass material, wherein the object side surfaces S11, S21, S31, S41 are convex surfaces, the image side surfaces S12, S22, S32, S42 are concave surfaces, and the object side surfaces S11, S21, S31, S41 and the image side surfaces S12, S22, S32, S42 are spherical surfaces.

The second lens L12, L22, L32, L42 are with negative refractive power and made of glass material, wherein the image side surfaces S14, S24, S34, S44 are concave surfaces.

The third lens L13, L23, L33, L43 are with positive refractive power and made of glass material, wherein the image side surfaces S16 S26, S36 S46 are convex surfaces, and the object side surfaces S15, S25, S35, S45 and the image side surfaces S16, S26, S36, S46 are spherical surfaces.

The fourth lens L14, L24, L34, L44 are biconvex lenses with positive refractive power and made of glass material, wherein the object side surfaces S18, S28, S38, S48 are convex surfaces, and the image side surfaces S19, S29, S39, S49 are convex surface.

The fifth lens L15, L25, L35, L45 are biconvex lenses with positive refractive power and made of glass material, wherein the object side surfaces S110, S210, S310, S410 are convex surfaces, the image side surfaces S111, S211, S411 are convex surfaces, and the object side surfaces S110, S210, S310, S410 and the image side surfaces S111, S211, S311, S411 are spherical surfaces.

The sixth lens L16, L26, L36, L46 are biconcave lenses with negative refractive power and made of glass material, wherein the object side surfaces S112, S212, S312, S412 are concave surfaces, the image side surfaces S113, S213, S313, S413 are concave surfaces, and the object side surfaces S112, S212, S312, S412 and the image side surfaces S113, S213, S313, S413 are spherical surfaces.

The seventh lens L17, L27, L37, L47 are biconvex lenses with positive refractive power and made of glass material, wherein the object side surfaces S114, S214 S314 S414 are convex surfaces, the image side surfaces S115, S215, S315, S415 are convex surfaces, and the object side surfaces S114, S214, S314, S414 and the image side surfaces S115, S215, S315, S415 are aspheric surfaces.

The fifth lenses L15, L25, L35, L45 and the sixth lenses L16, L26, L36, L46 are cemented respectively.

In addition, the lens assembly 1, 2, 3, 4 satisfy at least one of the following conditions:

$$4.3 \leq TTL/BFL \leq 5.3; \quad (1)$$

$$-1 \leq (R_{41}+R_{42})/(R_{41}-R_{42}) \leq 0; \quad (2)$$

$$8.5 \leq TTL/f \leq 11.5; \quad (3)$$

$$-3.5 \leq f_1/f \leq -2.4; \quad (4)$$

$$3 \leq f_3/f \leq 6; \quad (5)$$

$$2.5 \leq f_7/f \leq 5.2; \quad (6)$$

$$17.4 \text{ mm} \leq f+f_3 \leq 23.8 \text{ mm}; \quad (7)$$

wherein TTL is an interval in mm from the object side surfaces S11, S21, S31, S41 of the first lenses L11, L21, L31, L41 to the image planes IMA1, IMA2, IMA3, IMA4 along the optical axes OA1, OA2, OA3, OA4 respectively for the first to fourth embodiments, BFL is an interval in mm from the image side surfaces S115, S215, S315. S415 of the seventh lenses L17, L27, L37, L47 to the image planes IMA1, IMA2, IMA3, IMA4 along the optical axes OA1, OA2, OA3, OA4 respectively for the first to fourth embodiments, $R_{41}$ is a radius of curvature of the object side surface S18, S28, S38, S48 of the fourth lens L14, L24, L34, L44 for the first to fourth embodiments, $R_{42}$ is a radius of curvature of the image side surface S19, S29, S39, S49 of the fourth lens L14 L24, L34 L44 for the first to fourth embodiments, $f_1$ is an effective focal length of the first lenses L11, L21, L31, L41 for the first to fourth embodiments, $f_3$ is an effective focal length of the third lenses L13, L23, L33, L43 for the first to fourth embodiments, $f_7$ is an effective focal length of the seventh lenses L17, L27, L37, L47 for the first to fourth embodiments, and f is an effective focal length of the lens assemblies 1, 2, 3, 4 for the first to fourth embodiments. With the lens assemblies 1, 2, 3, 4 satisfying at least one of the above conditions (1)-(7), the field of view can be effectively increased, the resolution can be effectively increased, the environmental temperature change can be effectively resisted, the different focus while day and night can be effectively corrected, the aberration can be effectively corrected, and the chromatic aberration can be effectively corrected.

When the condition (1): 4.3≤TTL/BFL≤5.3 is satisfied, the back focal length can be increased, and helpful for assembling of the lens assembly.

When the condition (2): $-1 \leq (R_{41}\pm R_{42})/(R_{41}-R_{42}) \leq 0$ is satisfied, the outer shape of the fourth lens can be controlled effectively, and the back focal length can be increased.

When the condition (3): 8.5≤TTL/f≤11.5 is satisfied, the total length of the lens assembly can be decreased.

When the condition (4): $-3.5 \leq f_1/f \leq -2.4$ is satisfied, it can provide sufficient negative refractive power.

When the condition (5): $3 \leq f_3/f \leq 6$ is satisfied, the refractive power of the single lens in the lens assembly can be decreased, and to avoid the difference of the refractive power between lenses are too much to over image corrected or insufficient image corrected.

When the condition (6): $2.5 \leq f_7/f \leq 5.2$ is satisfied, it can provide sufficient positive refractive power.

When the condition (7): 17.4 mm≤f+f$_3$≤23.8 mm is satisfied, it can make the refractive power of the third lens not too high and help the processing of the third lens.

The common effect of condition (1): 4.3≤TTL/BFL≤5.3 and condition (2): $-1 \leq (R_{41}+R_{42})/(R_{41}-R_{42}) \leq 0$ is to achieve a longer back focal length, which allows greater flexibility in the design of the mechanism and facilitates assembling lens assembly.

When the first lens is a meniscus lens, it can achieve the function of large field of view with large light collection. When the second lens is a meniscus lens, it can further assist the shortage of light collection of the first lens. The third lens and the fourth lens both with positive refractive power, which can balance the first lens and the second lens both with negative refractive power, in order to correct the aberration. The fifth lens and the sixth lens are cemented together to effectively eliminate axial chromatic aberration and lateral chromatic aberration to enhance the resolution of the lens assembly. The seventh lens uses an aspheric design to correct the angle of incidence of light, which can significantly correct the field curvature and distortion of the lens assembly. When the stop is dispose between the third lens and the fourth lens, it can balance various types of aberration, reduce the outer diameter of the first lens and the seventh lens and to decrease the outer diameter of the imaging lens.

A detailed description of a lens assembly in accordance with a first embodiment of the invention is as follows. Referring to FIG. 1, the lens assembly 1 includes a first lens group LG11, a stop ST1, a second lens group LG12, an optical filter OF1, and a cover glass CG1. The first lens group LG11 includes a first lens L11, a second lens L12 and a third lens L13 in order from an object side to an image side along an optical axis OA1. The second lens group LG12 includes a fourth lens L14, a fifth lens L15, a sixth lens L16 and a seventh lens L17 in order from the object side to the image side along the optical axis OA1. In operation, an image of light rays from the object side is formed at an image plane IMA1.

According to the foregoing, wherein: the second lens L12 is a biconcave lens, wherein the object side surface S13 is a concave surface, and both of the object side surface S13 and the image side surface S14 are spherical surface; the third lens L13 is a biconvex lens, wherein the object side surface S15 is a convex surface; both of the object side surface S18 and the image side surface S19 of the fourth lens L14 are aspheric surfaces; both of the object side surface S116 and image side surface S117 of the optical filter OF1 are plane surfaces; and both of the object side surface S118 and image side surface S119 of the cover glass CG1 are plane surfaces.

With the above design of the lenses and stop ST1 and at least any one of the conditions (1)-(7) satisfied, the lens assembly 1 can have an effective increased field of view, an effective increased resolution, an effective resisted environmental temperature change, the different focus while day and night can be effectively corrected, an effective corrected aberration, and is capable of an effective corrected chromatic aberration.

Table 1 shows the optical specification of the lens assembly 1 in FIG. 1.

TABLE 1

Effective Focal Length = 3.65 mm F-number = 2.20
Total Lens Length = 32.00 mm Field of View = 111.09 degrees

| Surface Number | Radius of Curvature (mm) | Thickness (mm) | Nd | Vd | Effective Focal Length (mm) | Remark |
|---|---|---|---|---|---|---|
| S11 | 15.50 | 1.25 | 1.8 | 46.6 | −9.62 | The First Lens L11 |
| S12 | 4.99 | 3.47 | | | | |
| S13 | −33.82 | 1.09 | 1.75 | 45.4 | −7.32 | The Second Lens L12 |
| S14 | 6.74 | 1.09 | | | | |
| S15 | 17.19 | 4.81 | 1.76 | 27.5 | 13.83 | The Third Lens L13 |
| S16 | −23.88 | 4.68 | | | | |
| S17 | ∞ | 0.56 | | | | Stop ST1 |
| S18 | 8.03 | 2.04 | 1.77 | 49.6 | 7.38 | The Fourth Lens L14 |
| S19 | −17.60 | 0.31 | | | | |
| S110 | 35.58 | 2.62 | 1.5 | 81.5 | 8.55 | The Fifth Lens L15 |
| S111 | −4.72 | 0.00 | | | | |
| S112 | −4.72 | 0.90 | 1.81 | 25.5 | −5.68 | The Sixth Lens L16 |
| S113 | 200.93 | 0.61 | | | | |
| S114 | 12.30 | 1.88 | 1.67 | 55.4 | 18.26 | The Seventh Lens L17 |
| S115 | −1439.16 | 3.27 | | | | |
| S116 | ∞ | 0.50 | 1.52 | 64.2 | | Optical Filter OF1 |
| S117 | ∞ | 2.00 | | | | |
| S118 | ∞ | 0.40 | 1.52 | 64.2 | | Cover Glass CG1 |
| S119 | ∞ | 0.52 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E, and F are aspheric coefficients.

In the first embodiment, the conic constant k and the aspheric coefficients A, B, C, D, E, F of each aspheric surface are shown in Table 2.

TABLE 2

| Surface Number | k | A | B | C | D |
|---|---|---|---|---|---|
| | | E | F | | |
| S18 | 0.063 | −3.1940E−04 | −3.4575E−05 | −2.7049E−07 | −1.8221E−07 |
| | | −2.5748E−08 | 0 | | |
| S19 | 15.286 | −1.4949E−04 | −3.8689E−05 | 2.3719E−06 | −6.0220E−07 |
| | | 8.1311E−09 | 0 | | |
| S114 | 0.875 | −4.2828E−04 | −3.3596E−05 | 3.5171E−06 | −8.9435E−07 |
| | | 5.4330E−08 | 0 | | |
| S115 | 84482.227 | 1.2704E−03 | −8.5531E−06 | 2.5792E−06 | −6.2834E−07 |
| | | 4.2507E−08 | 0 | | |

Table 3 shows the parameters and condition values for conditions (1)-(7) in accordance with the first embodiment of the invention. It can be seen from Table 3 that the lens assembly 1 of the first embodiment satisfies the conditions (1)-(7).

TABLE 3

| BFL | 6.70 mm | | |
|---|---|---|---|
| TTL/BFL | 4.78 | $(R_{41} + R_{42})/(R_{41} - R_{42})$ −0.37 | TTL/f 8.77 |
| $f_1/f$ | −2.64 | $f_3/f$ 3.79 | $f_7/f$ 5.00 |
| $f + f_3$ | 17.480 | | |

Figure 2A:
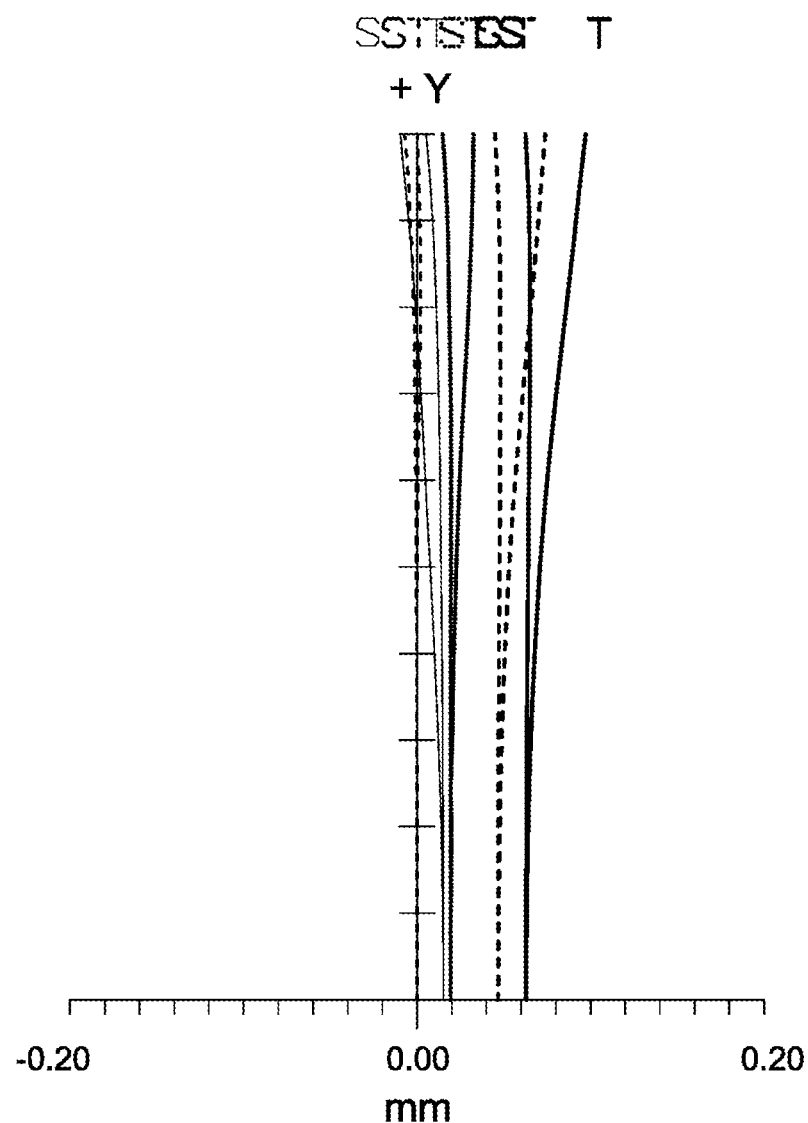
FIG. 2A depicts a field curvature diagram of the lens assembly in accordance with the first embodiment of the invention.
Figure 2B:
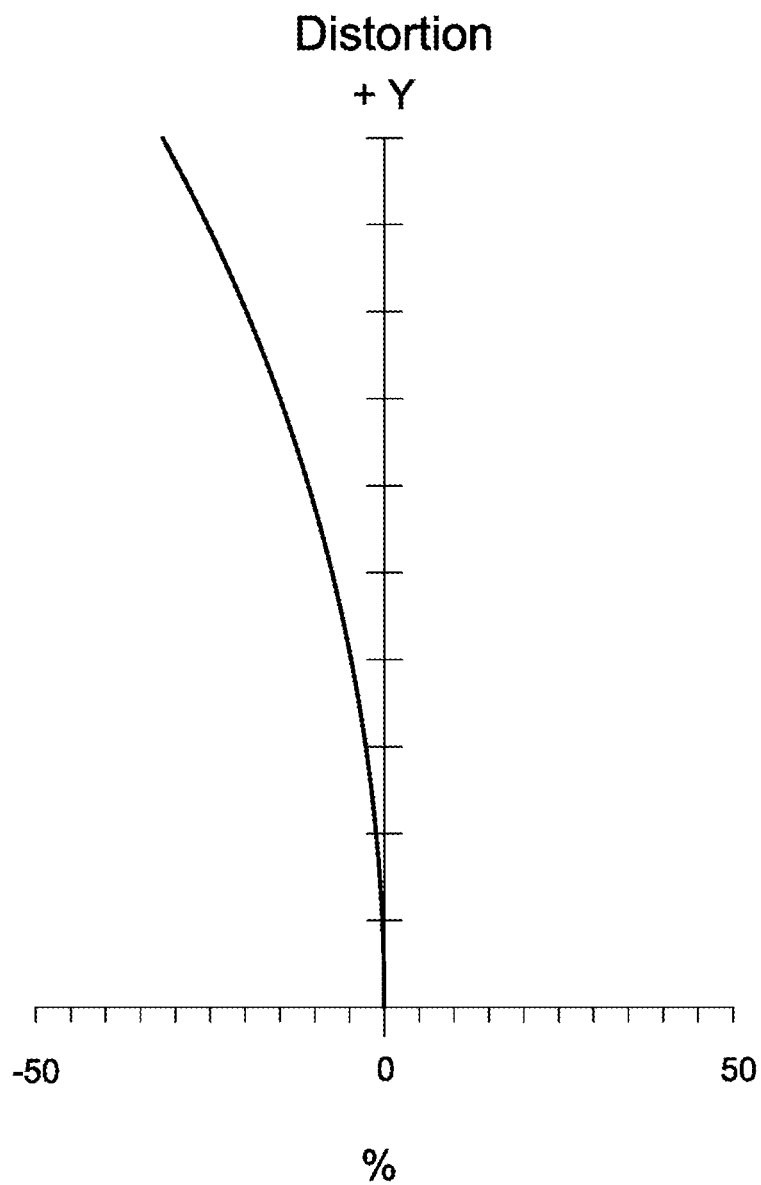
FIG. 2B is a distortion diagram of the lens assembly in accordance with the first embodiment of the invention.
Figure 2C:
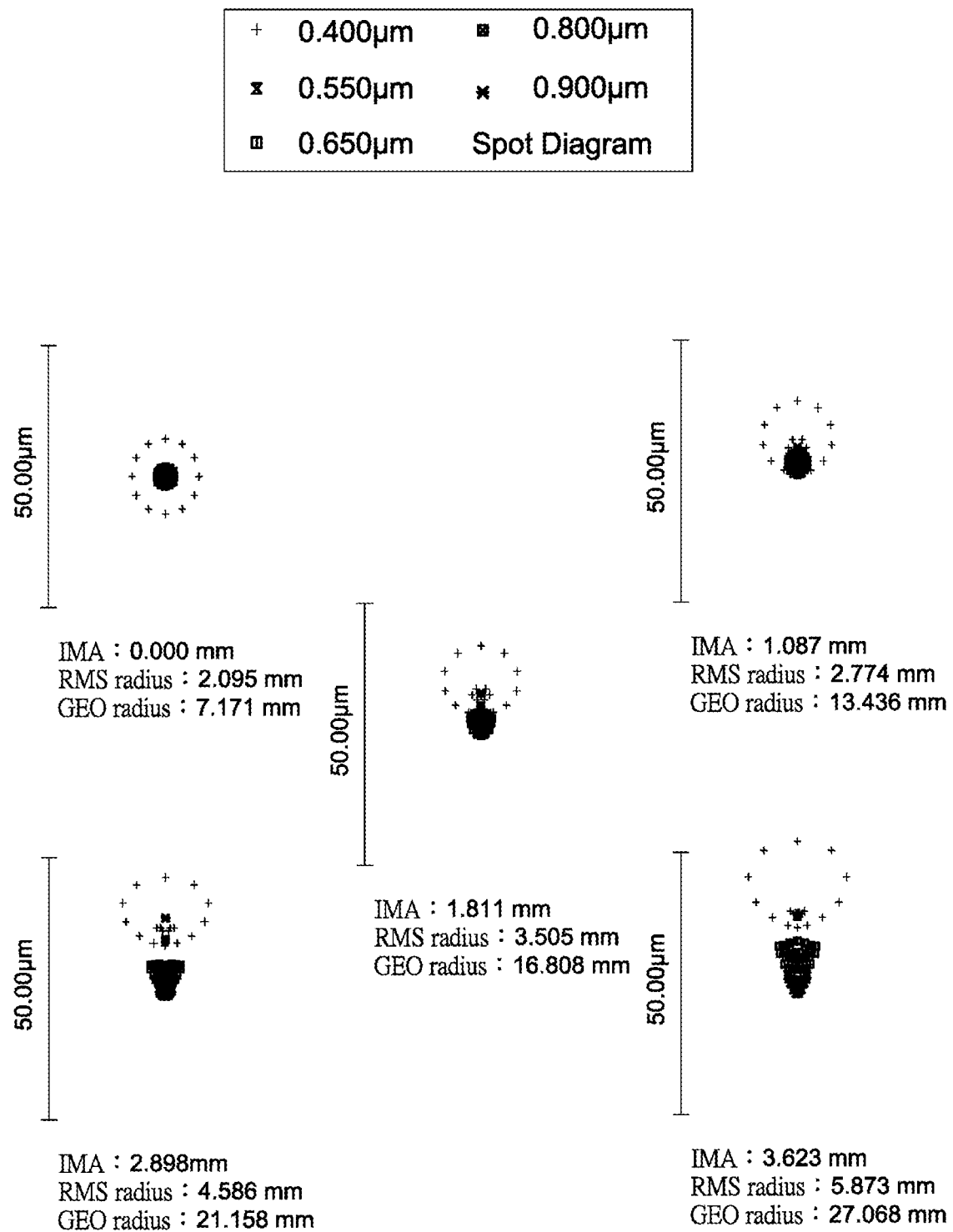
FIG. 2C is a spot diagram of the lens assembly in accordance with the first embodiment of the invention.
Figure 2D:
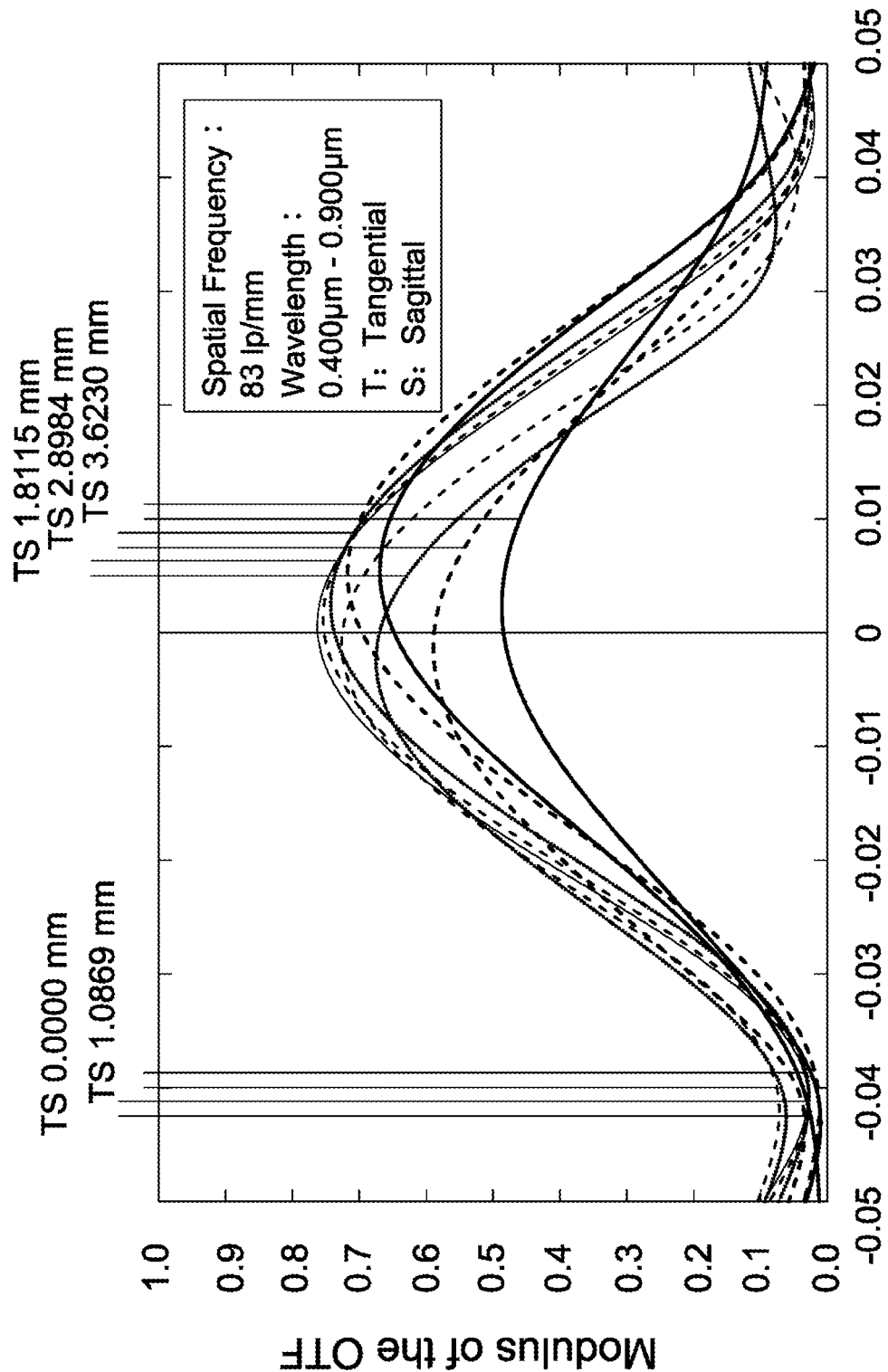
FIG. 2D is a through focus modulation transfer function diagram of the lens assembly in accordance with the first embodiment of the invention.

By the above arrangements of the lenses and stop ST1, the lens assembly 1 of the first embodiment can meet the requirements of optical performance. It can be seen from FIG. 2A that the field curvature of tangential direction and sagittal direction in the lens assembly 1 of the first embodiment ranges from −0.04 mm to 0.10 mm. It can be seen from FIG. 2B that the distortion in the lens assembly 1 of the first embodiment ranges from −35% to 0%. It can be seen from FIG. 2C that the root mean square spot radius is equal to 2.095 µm and geometrical spot radius is equal to 7.171 µm as image height is equal to 0.000 mm, the root mean square spot radius is equal to 2.774 µm and geometrical spot radius is equal to 13.436 µm as image height is equal to 1.087 mm, the root mean square spot radius is equal to 3.505 µm and geometrical spot radius is equal to 16.808 µm as image height is equal to 1.811 mm, the root mean square spot radius is equal to 4.586 µm and geometrical spot radius is equal to 21.158 µm as image height is equal to 2.898 mm, and the root mean square spot radius is equal to 5.873 µm and geometrical spot radius is equal to 27.068 µm as image height is equal to 3.623 mm for the lens assembly 1 of the first embodiment. It can be seen from FIG. 2D that the through focus modulation transfer function of tangential direction and sagittal direction in the lens assembly 1 of the first embodiment ranges from 0.0 to 0.76 as focus shift ranges from −0.05 mm to 0.05 mm. It is obvious that the field curvature and the distortion of the lens assembly 1 of the first embodiment can be corrected effectively, and the depth of focus of the lens assembly 1 of the first embodiment can meet the requirement. Therefore, the lens assembly 1 of the first embodiment is capable of good optical performance.

Figure 3:
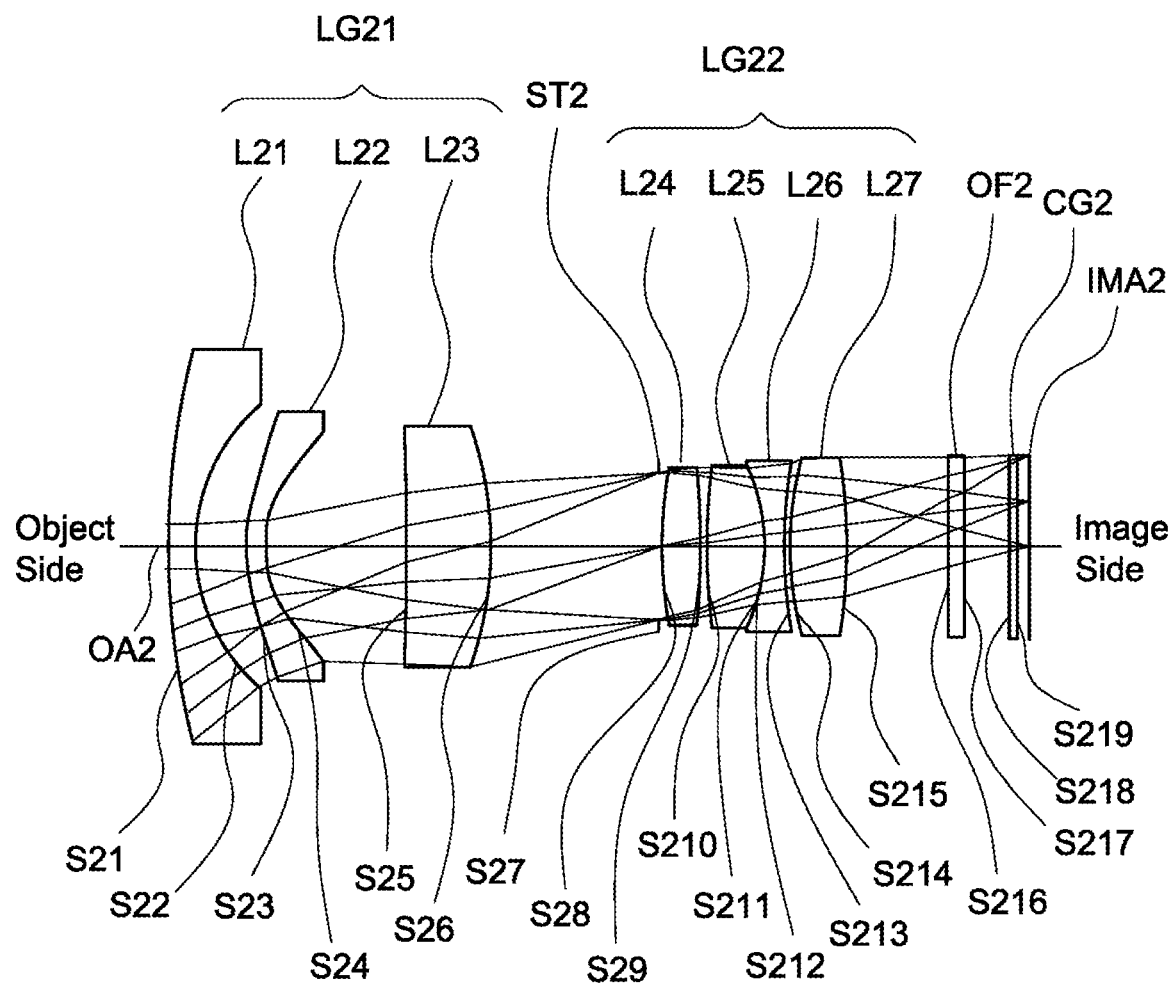
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens group LG21, a stop ST2, a second lens group LG22, an optical filter OF2, and a cover glass CG2. The first lens group LG21 includes a first lens L21, a second lens L22 and a third lens L23 in order from an object side to an image side along an optical axis OA2. The second lens group LG22 includes a fourth lens L24, a fifth lens L25, a sixth lens L26 and a seventh lens L27 in order from the object side to the image side along the optical axis OA2. In operation, an image of light rays from the object side is formed at an image plane IMA2.

According to the foregoing, wherein: the second lens L22 is a meniscus lens, wherein the object side surface S23 is a convex surface, and both of the object side surface S23 and the image side surface S24 are aspheric surface; the third lens L23 is a meniscus lens, wherein the object side surface S25 is a concave surface; both of the object side surface S28 and the image side surface S29 of the fourth lens L24 are spherical surfaces; both of the object side surface S216 and image side surface S217 of the optical filter OF2 are plane surfaces; and both of the object side surface S218 and image side surface S219 of the cover glass CG2 are plane surfaces.

With the above design of the lenses and stop ST2 and at least any one of the conditions (1)-(7) satisfied, the lens assembly 2 can have an effective increased field of view, an effective increased resolution, an effective resisted environmental temperature change, the different focus while day and night can be effectively corrected, an effective corrected aberration, and is capable of an effective corrected chromatic aberration.

Table 4 shows the optical specification of the lens assembly 2 in FIG. 3.

TABLE 4

Effective Focal Length = 3.61 mm F-number = 2.00
Total Lens Length = 38.04 mm Field of View = 111.08 degrees

| Surface Number | Radius of Curvature (mm) | Thickness (mm) | Nd | Vd | Effective Focal Length (mm) | Remark |
|---|---|---|---|---|---|---|
| S21 | 28.56 | 1.21 | 1.8 | 46.6 | −11.82 | The First Lens L21 |
| S22 | 7.02 | 2.25 | | | | |
| S23 | 7.41 | 0.84 | 1.75 | 45.4 | −12.04 | The Second Lens L22 |
| S24 | 3.89 | 6.22 | | | | |
| S25 | −134.72 | 3.75 | 1.76 | 27.5 | 19.4 | The Third Lens L23 |
| S26 | −13.47 | 7.49 | | | | |
| S27 | ∞ | 0.09 | | | | Stop ST2 |
| S28 | 14.32 | 1.74 | 1.77 | 49.6 | 11.13 | The Fourth Lens L24 |
| S29 | −20.58 | 0.23 | | | | |
| S210 | 29.67 | 2.53 | 1.5 | 81.5 | 12.03 | The Fifth Lens L25 |
| S211 | −7.30 | 0.00 | | | | |
| S212 | −7.30 | 0.92 | 1.81 | 25.5 | −6.1 | The Sixth Lens L26 |
| S213 | 16.28 | 0.30 | | | | |
| S214 | 15.37 | 2.47 | 1.67 | 55.4 | 10.65 | The Seventh Lens L27 |
| S215 | −12.40 | 4.44 | | | | |
| S216 | ∞ | 0.70 | 1.52 | 64.2 | | Optical Filter OF2 |
| S217 | ∞ | 2.00 | | | | |
| S218 | ∞ | 0.40 | 1.52 | 64.2 | | Cover Glass CG2 |
| S219 | ∞ | 0.48 | | | | |

The definition of aspheric surface sag z of each aspheric lens in table 4 is the same as that of in Table 1, and is not described here again.

In the second embodiment, the conic constant k and the aspheric coefficients A, B, C, D, E, F of each aspheric surface are shown in Table 5.

TABLE 5

| Surface Number | k | A<br>E | B<br>F | C | D |
|---|---|---|---|---|---|
| S23 | −0.591 | −4.2471E−04<br>3.7293E−10 | −2.7645E−05<br>0 | 1.0776E−06 | −2.9308E−08 |
| S24 | −1.035 | 5.6206E−04<br>2.1644E−09 | −5.5274E−05<br>0 | 2.3166E−06 | −1.0623E−07 |
| S214 | 6.717 | −2.0352E−04<br>−9.7213E−10 | 1.3335E−05<br>0 | 5.8164E−07 | 2.6889E−08 |

TABLE 5-continued

| Surface Number | k | A E | B F | C | D |
|---|---|---|---|---|---|
| S215 | 1.208 | 5.4512E−04 −1.1636E−09 | 1.2665E−05 0 | 3.3181E−07 | 8.0310E−08 |

Table 6 shows the parameters and condition values for conditions (1)-(7) in accordance with the second embodiment of the invention. It can be seen from Table 6 that the lens assembly 2 of the second embodiment satisfies the conditions (1)-(7).

TABLE 6

| BFL | 8.02 mm | | | | |
|---|---|---|---|---|---|
| TTL/BFL | 4.74 | $(R_{41} + R_{42})/(R_{41} - R_{42})$ | −0.18 | TTL/f | 10.54 |
| $f_1/f$ | −3.27 | $f_3/f$ | | 5.37 | $f_7/f$ | 2.95 |
| $f + f_3$ | 23.010 | | | | |

Figure 4A:
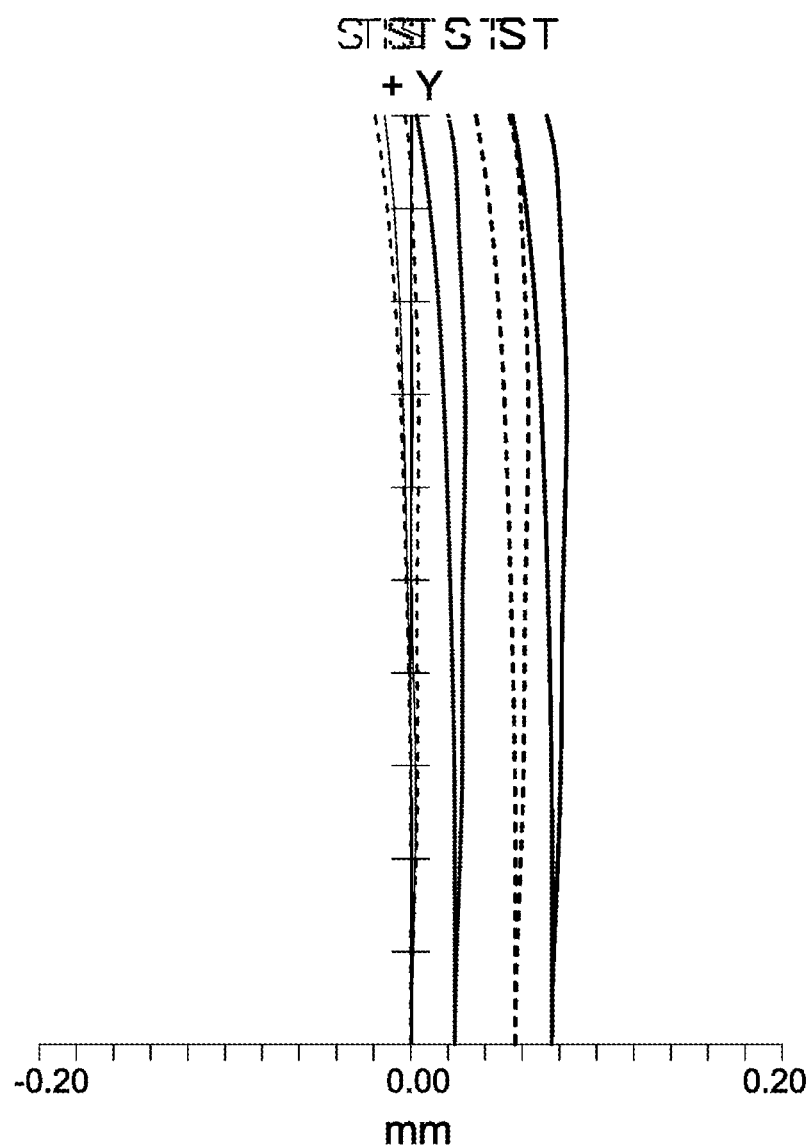
FIG. 4A depicts a field curvature diagram of the lens assembly in accordance with the second embodiment of the invention.
Figure 4B:
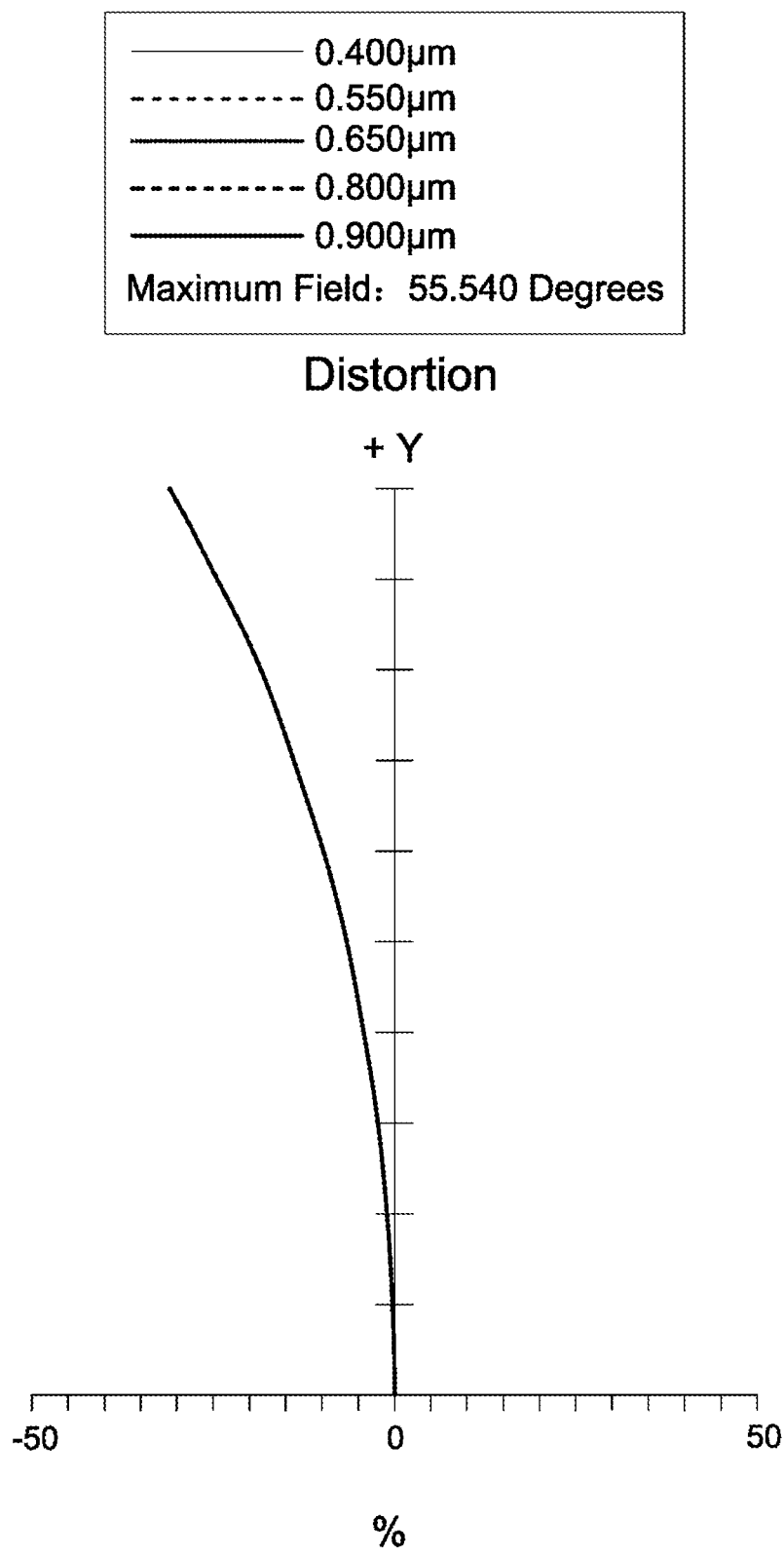
FIG. 4B is a distortion diagram of the lens assembly in accordance with the second embodiment of the invention.
Figure 4C:
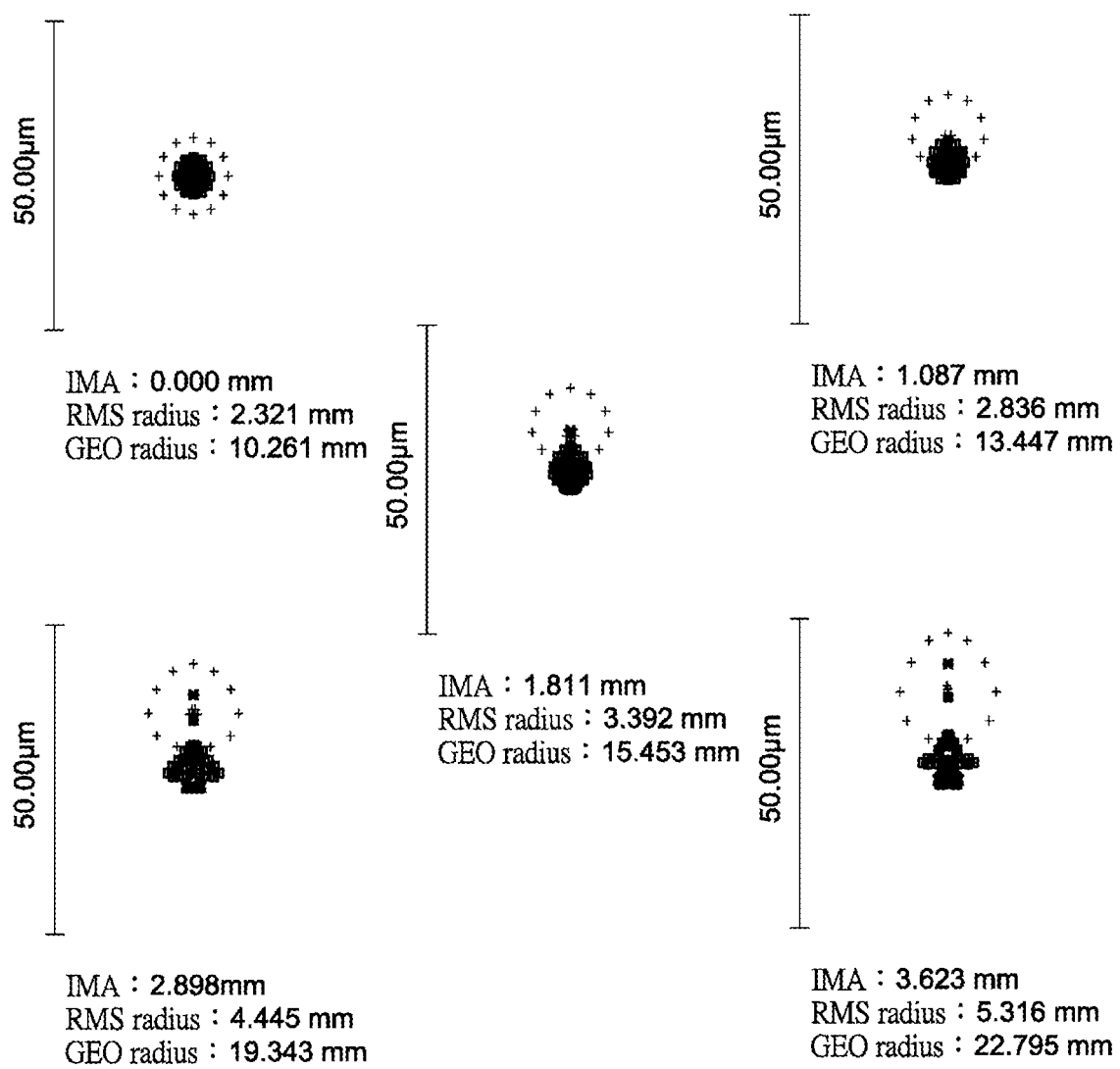
FIG. 4C is a spot diagram of the lens assembly in accordance with the second embodiment of the invention.
Figure 4D:
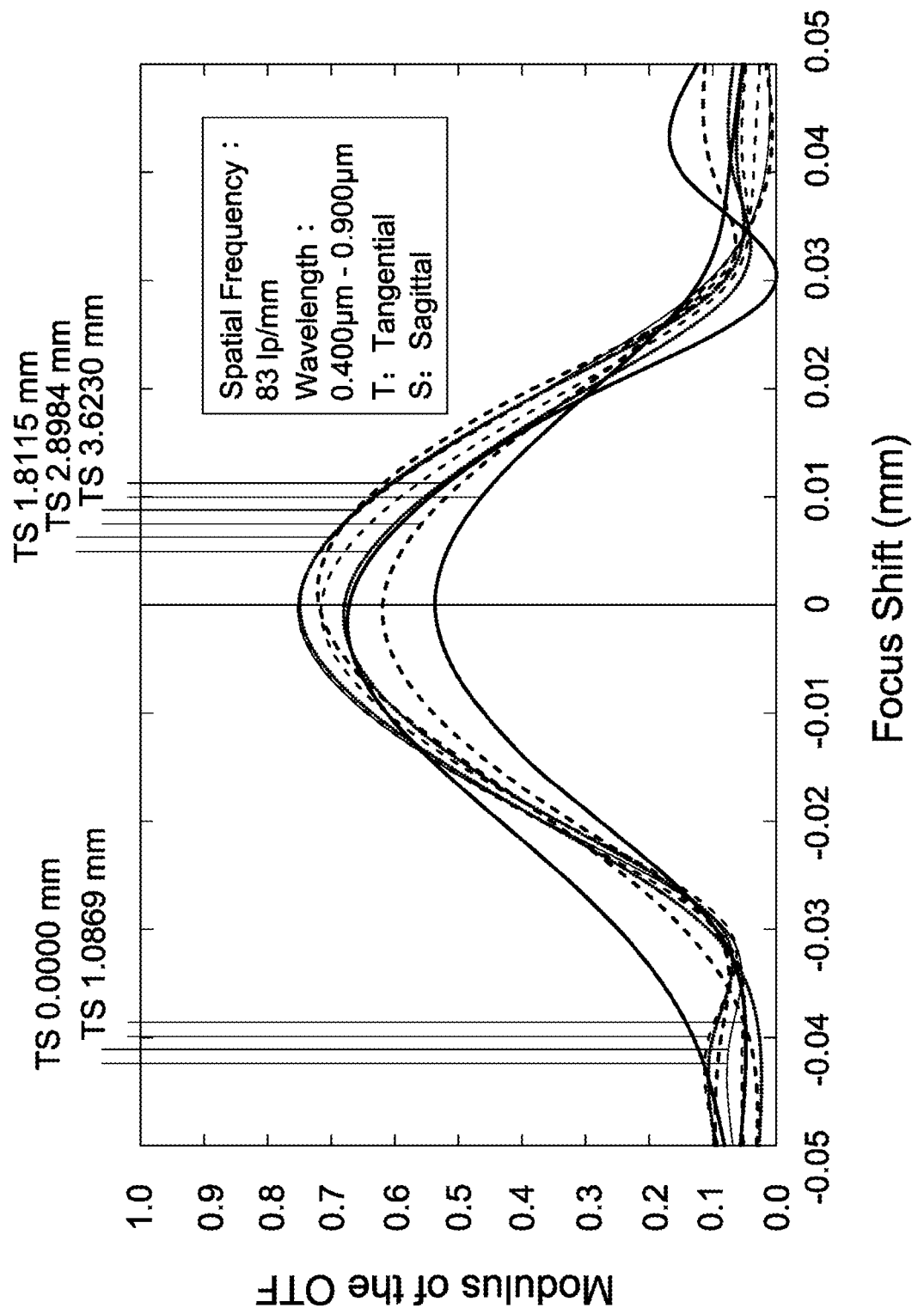
FIG. 4D is a through focus modulation transfer function diagram of the lens assembly in accordance with the second embodiment of the invention.

By the above arrangements of the lenses and stop ST2, the lens assembly 2 of the second embodiment can meet the requirements of optical performance. It can be seen from FIG. 4A that the field curvature of tangential direction and sagittal direction in the lens assembly 2 of the second embodiment ranges from −0.04 mm to 0.09 mm. It can be seen from FIG. 4B that the distortion in the lens assembly 2 of the second embodiment ranges from −35% to 0%. It can be seen from FIG. 4C that the root mean square spot radius is equal to 2.231 µm and geometrical spot radius is equal to 10.261 µm as image height is equal to 0.000 mm, the root mean square spot radius is equal to 2.836 µm and geometrical spot radius is equal to 13.447 µm as image height is equal to 1.087 mm, the root mean square spot radius is equal to 3.392 µm and geometrical spot radius is equal to 15.453 µm as image height is equal to 1.811 mm, the root mean square spot radius is equal to 4.445 µm and geometrical spot radius is equal to 19.343 µm as image height is equal to 2.898 mm, and the root mean square spot radius is equal to 5.316 µm and geometrical spot radius is equal to 22.795 µm as image height is equal to 3.623 rum for the lens assembly 2 of the second embodiment. It can be seen from FIG. 4D that the through focus modulation transfer function of tangential direction and sagittal direction in the lens assembly 2 of the second embodiment ranges from 0.0 to 0.75 as focus shift ranges from −0.05 mm to 0.05 mm. It is obvious that the field curvature and the distortion of the lens assembly 2 of the second embodiment can be corrected effectively, and the depth of focus of the lens assembly 2 of the second embodiment can meet the requirement. Therefore, the lens assembly 2 of the second embodiment is capable of good optical performance.

Figure 5:
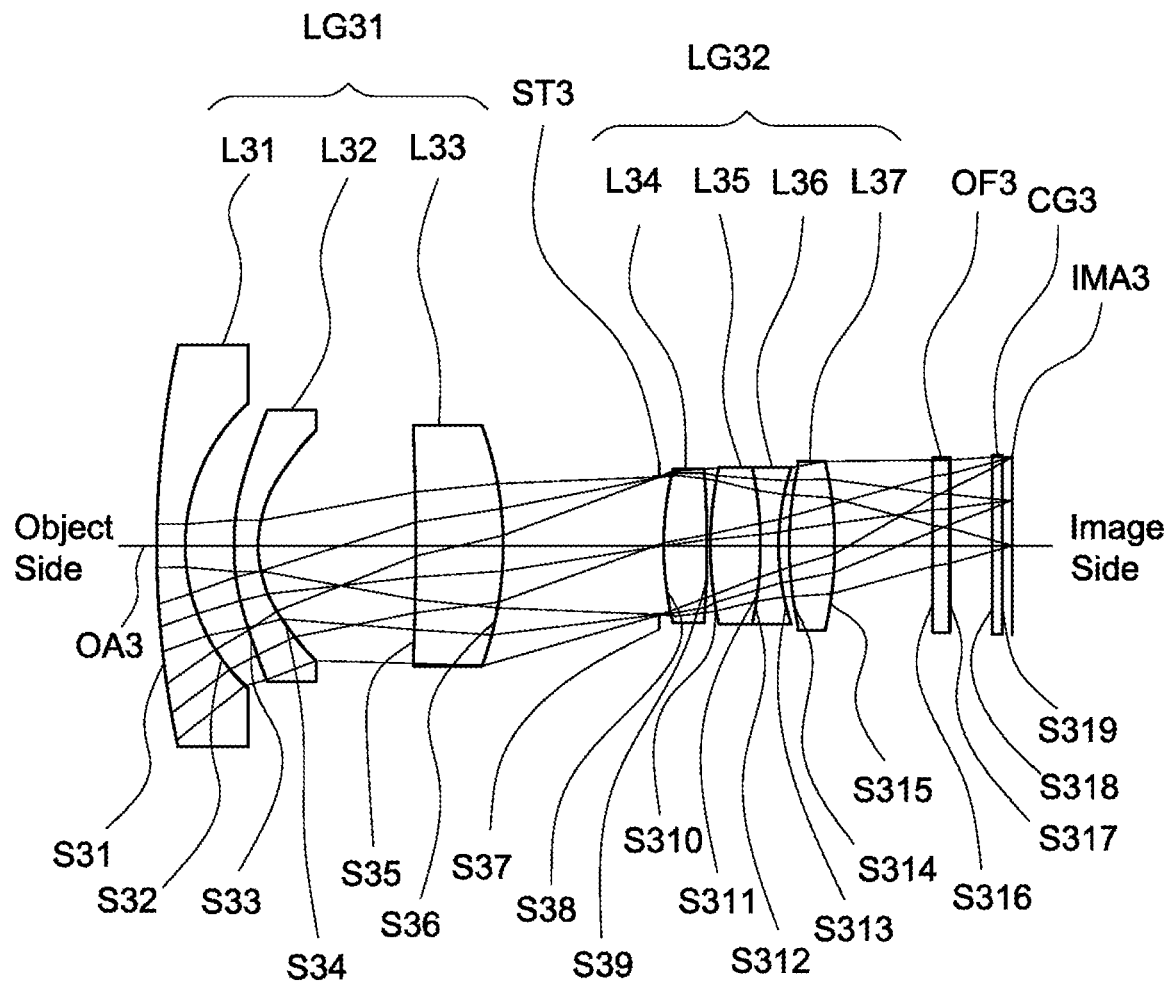
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens group LG31, a stop ST3, a second lens group LG32, an optical filter OF3, and a cover glass CG3. The first lens group LG31 includes a first lens L31, a second lens L32 and a third lens L33 in order from an object side to an image side along an optical axis OA3. The second lens group LG32 includes a fourth lens L34, a fifth lens L35, a sixth lens L36 and a seventh lens L37 in order from the object side to the image side along the optical axis OA3. In operation, an image of light rays from the object side is formed at an image plane IMA3.

According to the foregoing, wherein: the second lens L32 is a meniscus lens, wherein the object side surface S33 is a convex surface, and both of the object side surface S33 and the image side surface S34 are aspheric surface; the third lens L33 is a meniscus lens, wherein the object side surface S35 is a concave surface; both of the object side surface S38 and the image side surface S39 of the fourth lens L34 are spherical surfaces; both of the object side surface S316 and image side surface S317 of the optical filter OF3 are plane surfaces; and both of the object side surface S318 and image side surface S319 of the cover glass CG3 are plane surfaces.

With the above design of the lenses and stop ST3 and at least any one of the conditions (1)-(7) satisfied, the lens assembly 3 can have an effective increased field of view, an effective increased resolution, an effective resisted environmental temperature change, the different focus while day and night can be effectively corrected, an effective corrected aberration, and is capable of an effective corrected chromatic aberration.

Table 7 shows the optical specification of the lens assembly 3 in FIG. 5.

TABLE 7

Effective Focal Length = 3.59 mm F-number = 2.05
Total Lens Length = 38.81 mm Field of View = 110.59 degrees

| Surface Number | Radius of Curvature (mm) | Thickness (mm) | Nd | Vd | Effective Focal Length (mm) | Remark |
|---|---|---|---|---|---|---|
| S31 | 36.03 | 1.30 | 1.8 | 46.6 | −11.81 | The First Lens L31 |
| S32 | 7.42 | 2.22 | | | | |
| S33 | 9.76 | 1.16 | 1.75 | 45.3 | −13.23 | The Second Lens L32 |
| S34 | 4.68 | 7.10 | | | | |
| S35 | −113.37 | 3.91 | 1.76 | 27.5 | 19.89 | The Third Lens L33 |
| S36 | −13.55 | 7.14 | | | | |
| S37 | ∞ | 0.18 | | | | Stop ST3 |
| S38 | 10.38 | 1.95 | 1.69 | 54.6 | 12.75 | The Fourth Lens L34 |
| S39 | −55.94 | 0.25 | | | | |
| S310 | 14.51 | 2.20 | 1.5 | 81.5 | 13.39 | The Fifth Lens L35 |
| S311 | −11.72 | 0.00 | | | | |
| S312 | −11.72 | 0.83 | 1.81 | 25.5 | −6.07 | The Sixth Lens L36 |
| S313 | 8.77 | 0.45 | | | | |
| S314 | 12.49 | 2.10 | 1.67 | 55.1 | 9.29 | The Seventh Lens L37 |
| S315 | −11.51 | 4.44 | | | | |
| S316 | ∞ | 0.70 | 1.52 | 64.2 | | Optical Filter OF3 |
| S317 | ∞ | 2.00 | | | | |
| S318 | ∞ | 0.40 | 1.52 | 64.2 | | Cover Glass CG3 |
| S319 | ∞ | 0.47 | | | | |

The definition of aspheric surface sag z of each aspheric lens in table 7 is the same as that of in Table 1, and is not described here again.

In the third embodiment, the conic constant k and the aspheric coefficients A, B, C, D, E, F of each aspheric surface are shown in Table 8.

TABLE 8

| Surface Number | k | A E | B F | C | D |
|---|---|---|---|---|---|
| S33 | 1.0793 | 0.00055681 2.4042E−10 | −5.38E−05 0 | 1.18072E−06 | −2.558E−08 |
| S34 | −0.5729 | 0.00118637 1.4542E−09 | −7.492E−05 0 | 1.09791E−06 | −5.986E−08 |
| S314 | 1.3061 | −3.210E−04 1.103E−08 | −1.974E−05 8.847E−11 | 4.887E−06 | −4.004E−07 |
| S315 | 0.5403 | 3.598E−04 −3.189E−08 | −8.235E−06 9.927E−10 | −3.336E−07 | 3.277E−07 |

Table 9 shows the parameters and condition values for conditions (1)-(7) in accordance with the third embodiment of the invention. It can be seen from Table 9 that the lens assembly 3 of the third embodiment satisfies the conditions (1)-(7).

TABLE 9

| BFL | 8.02 mm | | | | |
|---|---|---|---|---|---|
| TTL/BFL | 4.84 | $(R_{41} + R_{42})/(R_{41} - R_{42})$ | −0.69 | TTL/f | 10.81 |
| $f_1/f$ | −3.29 | $f_3/f$ | 5.54 | $f_7/f$ | 2.59 |
| $f + f_3$ | 23.480 | | | | |

Figure 6A:
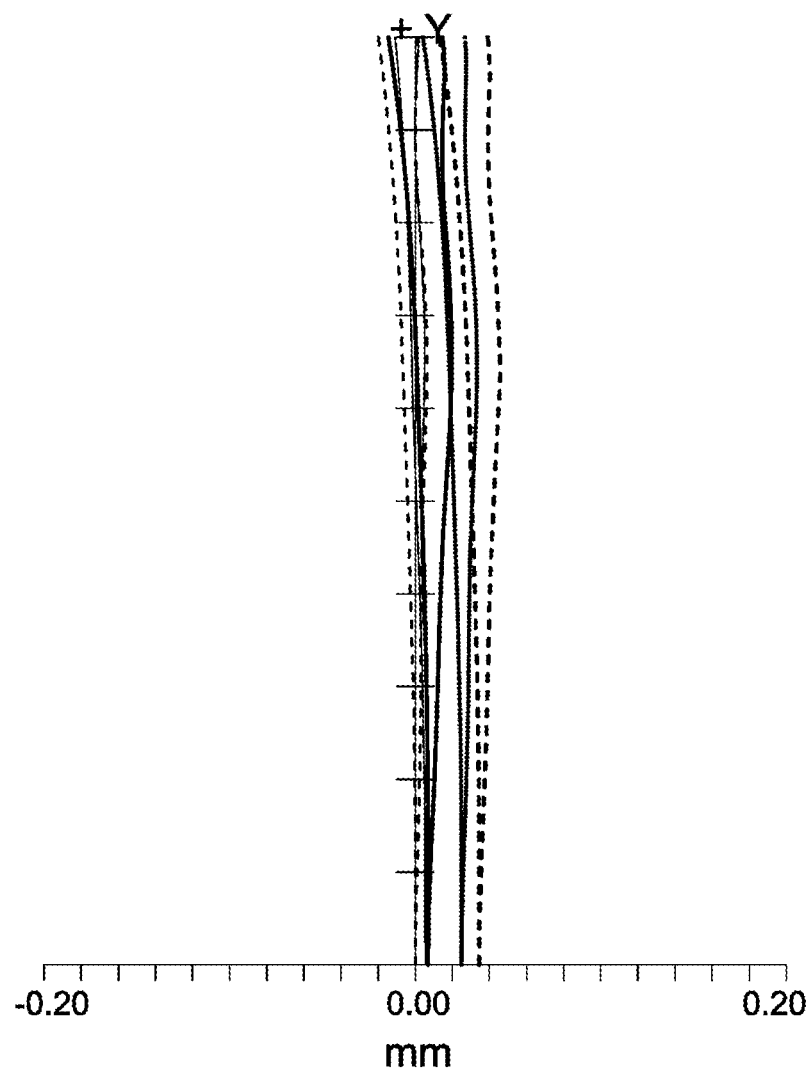
FIG. 6A depicts a field curvature diagram of the lens assembly in accordance with the third embodiment of the invention.
Figure 6B:
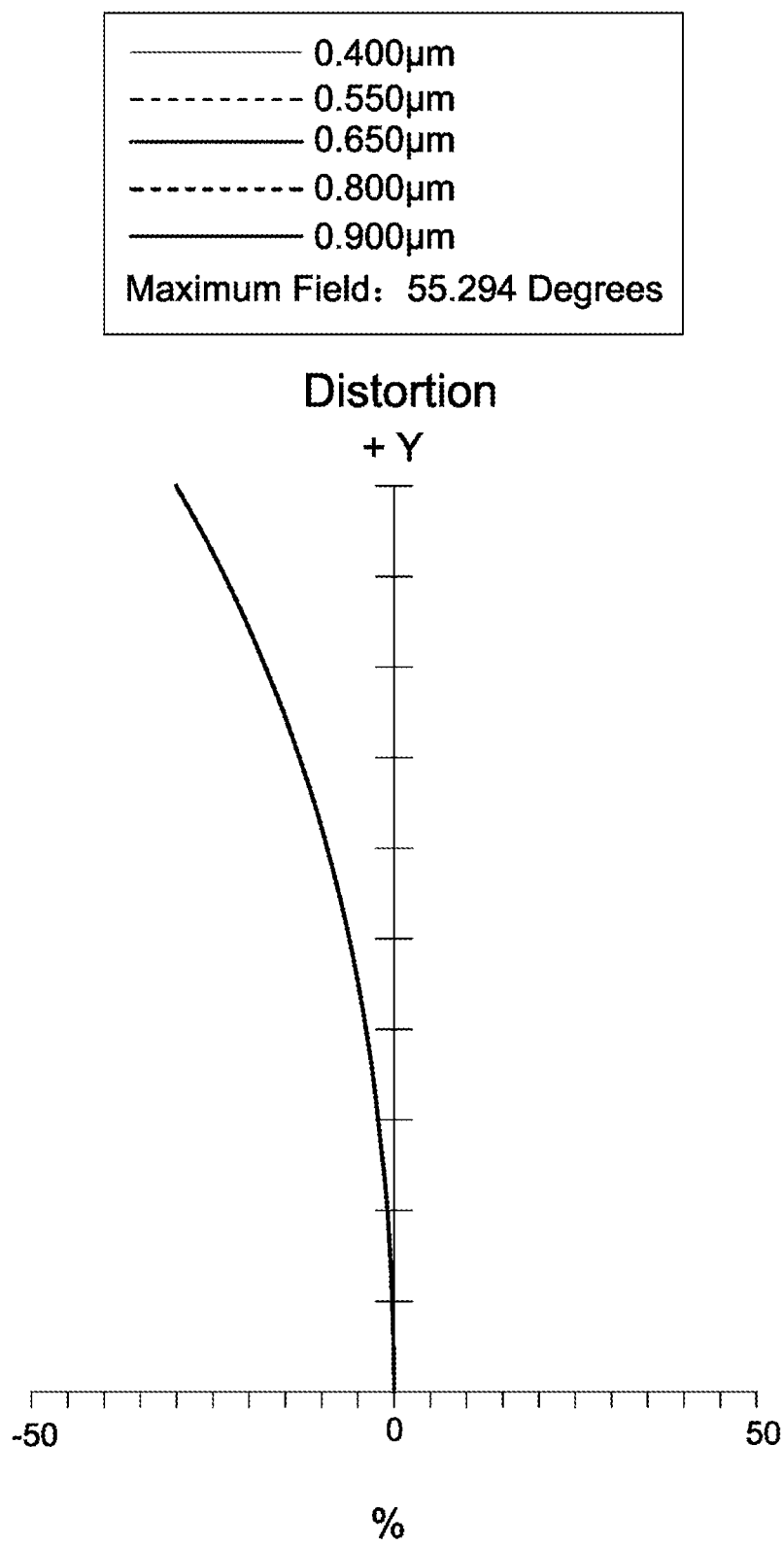
FIG. 6B is a distortion diagram of the lens assembly in accordance with the third embodiment of the invention.
Figure 6C:
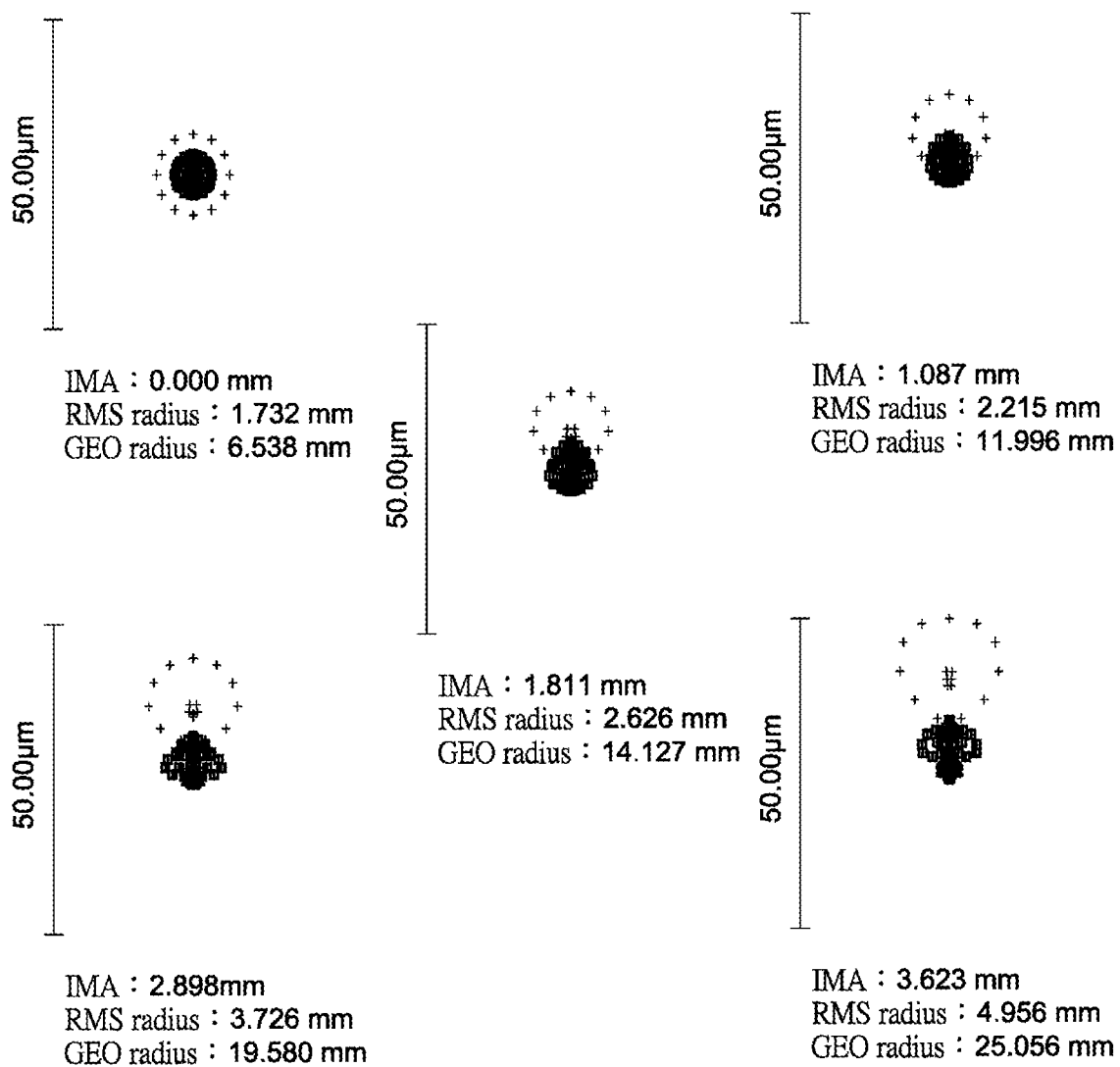
FIG. 6C is a spot diagram of the lens assembly in accordance with the third embodiment of the invention.
Figure 6D:
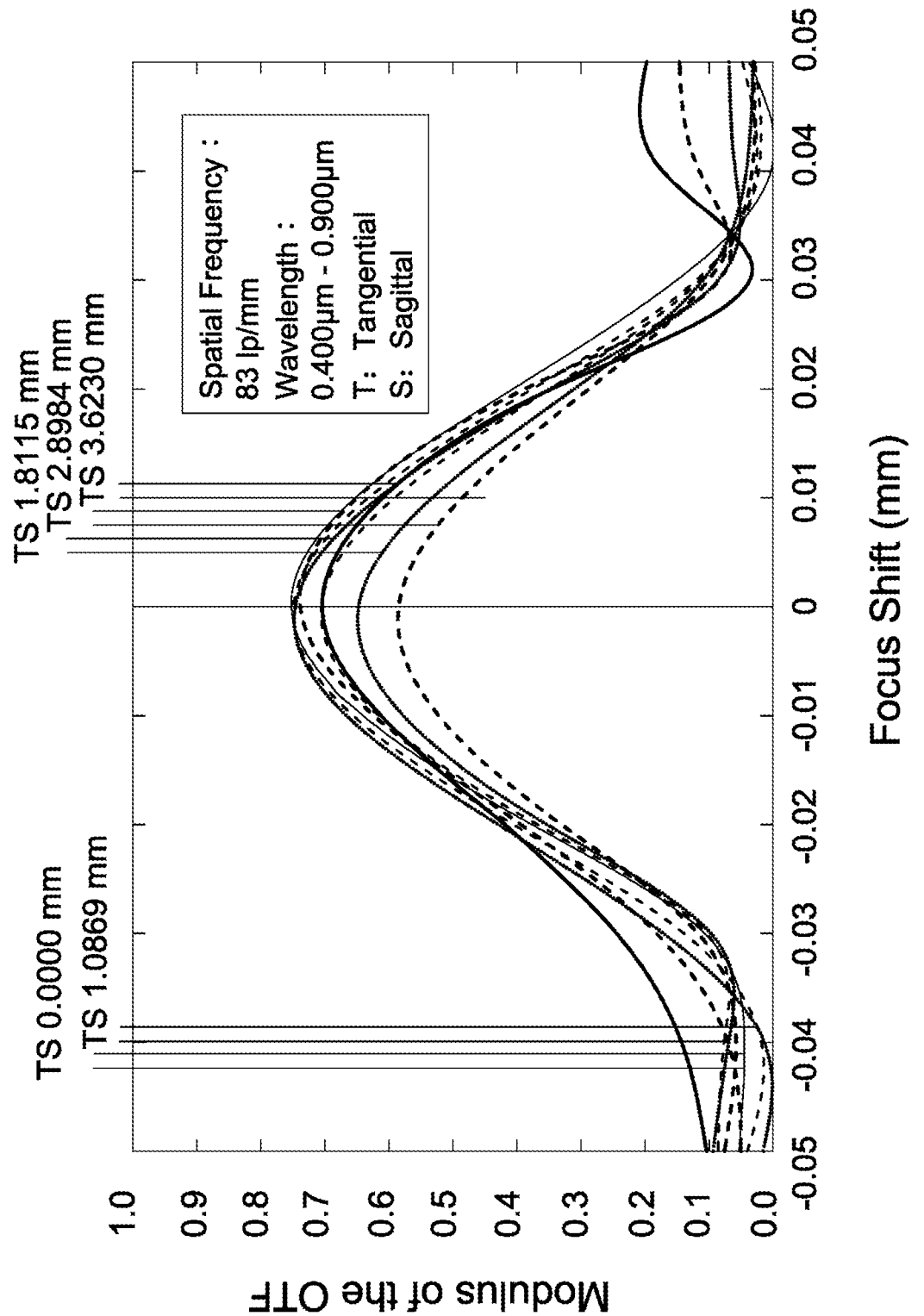
FIG. 6D is a through focus modulation transfer function diagram of the lens assembly in accordance with the third embodiment of the invention.

By the above arrangements of the lenses and stop ST3, the lens assembly 3 of the third embodiment can meet the requirements of optical performance. It can be seen from FIG. 6A that the field curvature of tangential direction and sagittal direction in the lens assembly 3 of the third embodiment ranges from −0.04 mm to 0.05 mm. It can be seen from FIG. 6B that the distortion in the lens assembly 3 of the third embodiment ranges from −30% to 0%. It can be seen from FIG. 6C that the root mean square spot radius is equal to 1.732 μm and geometrical spot radius is equal to 6.538 μm as image height is equal to 0.000 mm, the root mean square spot radius is equal to 2.215 μm and geometrical spot radius is equal to 11.996 μm as image height is equal to 1.087 mm, the root mean square spot radius is equal to 2.626 μm and geometrical spot radius is equal to 14.127 μm as image height is equal to 1.811 mm, the root mean square spot radius is equal to 3.726 μm and geometrical spot radius is equal to 19.580 μm as image height is equal to 2.898 mm, and the root mean square spot radius is equal to 4.956 μm and geometrical spot radius is equal to 20.056 μm as image height is equal to 3.623 mm for the lens assembly 3 of the third embodiment. It can be seen from FIG. 6D that the through focus modulation transfer function of tangential direction and sagittal direction in the lens assembly 3 of the third embodiment ranges from 0.0 to 0.75 as focus shift ranges from −0.05 mm to 0.05 mm. It is obvious that the field curvature and the distortion of the lens assembly 3 of the third embodiment can be corrected effectively, and the depth of focus of the lens assembly 3 of the third embodiment can meet the requirement. Therefore, the lens assembly 3 of the third embodiment is capable of good optical performance.

Figure 7:
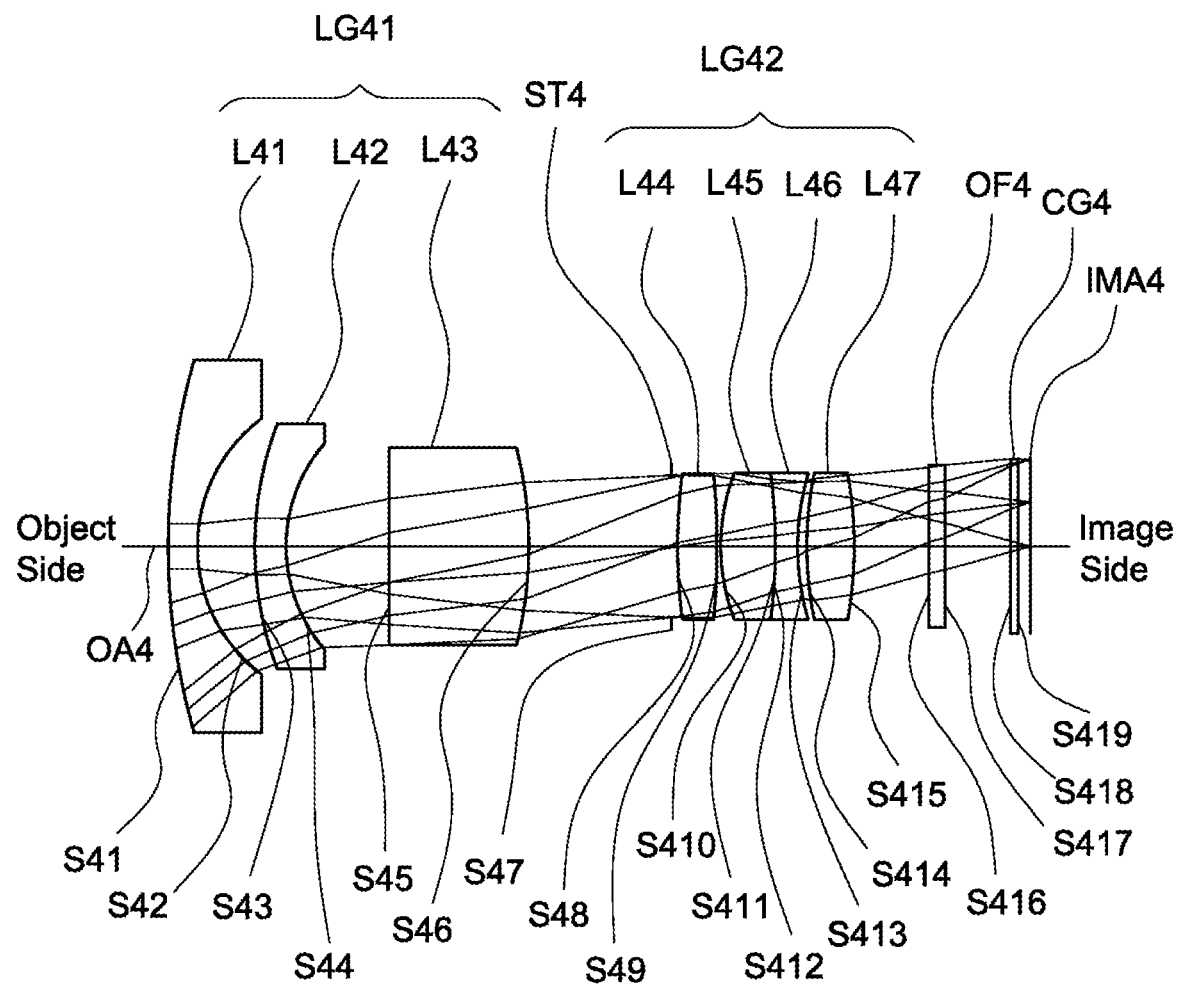
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens group LG41, a stop ST4, a second lens group LG42, an optical filter OF4, and a cover glass CG4. The first lens group LG41 includes a first lens L41, a second lens L42 and a third lens L43 in order from an object side to an image side along an optical axis OA4. The second lens group LG42 includes a fourth lens L44, a fifth lens L45, a sixth lens L46 and a seventh lens L47 in order from the object side to the image side along the optical axis OA4. In operation, an image of light rays from the object side is formed at an image plane IMA4.

According to the foregoing, wherein: the second lens L42 is a meniscus lens, wherein the object side surface S43 is a convex surface, and both of the object side surface S43 and the image side surface S44 are aspheric surface; the third lens L43 is a plane-convex lens, wherein the object side surface S45 is a plane surface; both of the object side surface S48 and the image side surface S49 of the fourth lens L44 are spherical surfaces; both of the object side surface S416 and image side surface S417 of the optical filter OF4 are plane surfaces; and both of the object side surface S418 and image side surface S419 of the cover glass CG4 are plane surfaces.

With the above design of the lenses and stop ST4 and at least any one of the conditions (1)-(7) satisfied, the lens assembly 4 can have an effective increased field of view, an effective increased resolution, an effective resisted environmental temperature change, the different focus while day and night can be effectively corrected, an effective corrected aberration, and is capable of an effective corrected chromatic aberration.

Table 10 shows the optical specification of the lens assembly 4 in FIG. 7.

TABLE 10

Effective Focal Length = 3.62 mm F-number = 1.95
Total Lens Length = 39.50 mm Field of View = 110.63 degrees

| Surface Number | Radius of Curvature (mm) | Thickness (mm) | Nd | Vd | Effective Focal Length (mm) | Remark |
|---|---|---|---|---|---|---|
| S41 | 25.05 | 1.30 | 1.8 | 46.6 | −10.59 | The First Lens L41 |
| S42 | 6.23 | 2.67 | | | | |
| S43 | 16.41 | 1.43 | 1.74 | 49.2 | −14.56 | The Second Lens L42 |
| S44 | 6.27 | 4.74 | | | | |
| S45 | ∞ | 6.39 | 1.76 | 27.5 | 20.04 | The Third Lens L43 |
| S46 | −15.25 | 6.56 | | | | |
| S47 | ∞ | 0.31 | | | | Stop ST4 |
| S48 | 22.10 | 1.81 | 1.69 | 54.6 | 16.18 | The Fourth Lens L44 |
| S49 | −22.10 | 0.16 | | | | |
| S410 | 8.53 | 2.49 | 1.5 | 81.5 | 12.08 | The Fifth Lens L45 |
| S411 | −18.44 | 0.00 | | | | |
| S412 | −18.44 | 1.00 | 1.81 | 25.5 | −6.59 | The Sixth Lens L46 |
| S413 | 7.72 | 0.45 | | | | |
| S414 | 10.96 | 2.18 | 1.68 | 54.9 | 9.73 | The Seventh Lens L47 |

TABLE 10-continued

Effective Focal Length = 3.62 mm F-number = 1.95
Total Lens Length = 39.50 mm Field of View = 110.63 degrees

| Surface Number | Radius of Curvature (mm) | Thickness (mm) | Nd | Vd | Effective Focal Length (mm) | Remark |
|---|---|---|---|---|---|---|
| S415 | −15.14 | 3.44 | | | | |
| S416 | ∞ | 0.70 | 1.52 | 64.2 | | Optical Filter OF4 |
| S417 | ∞ | 3.00 | | | | |
| S418 | ∞ | 0.40 | 1.52 | 64.2 | | Cover Glass CG4 |
| S419 | ∞ | 0.48 | | | | |

The definition of aspheric surface sag z of each aspheric lens in table 10 is the same as that of in Table 1, and is not described here again.

In the fourth embodiment, the conic constant k and the aspheric coefficients A, B, C, D, E, F of each aspheric surface are shown in Table 11.

TABLE 11

| Surface Number | k | A E | B F | C | D |
|---|---|---|---|---|---|
| S43 | 3.6941 | 0.00078745<br>1.8569E−10 | −3.744E−05<br>−8.5911E−13 | 7.90963E−07 | −1.621E−08 |
| S44 | −0.1098 | 0.00115783<br>1.8617E−09 | −4.995E−05<br>−2.2424E−11 | 8.02588E−07 | −6.08E−08 |
| S414 | 3.2631 | −4.486E−04<br>−1.035E−08 | 2.714E−06<br>1.974E−10 | −1.626E−06 | 1.616E−07 |
| S415 | −0.4659 | 1.268E−04<br>−5.744E−10 | 2.027E−06<br>−1.158E−10 | −8.169E−07 | 5.634E−08 |

Table 12 shows the parameters and condition values for conditions (1)-(7) in accordance with the fourth embodiment of the invention. It can be seen from Table 12 that the lens assembly 4 of the fourth embodiment satisfies the conditions (1)-(7).

TABLE 12

| BFL | 8.02 mm | | | | |
|---|---|---|---|---|---|
| TTL/BFL | 4.93 | $(R_{41} + R_{42})/(R_{41} - R_{42})$ | 0 | TTL/f | 10.93 |
| $f_1/f$ | −2.93 | $f_3/f$ | 5.54 | $f_7/f$ | 2.69 |
| $f + f_3$ | 23.655 | | | | |

Figure 8A:
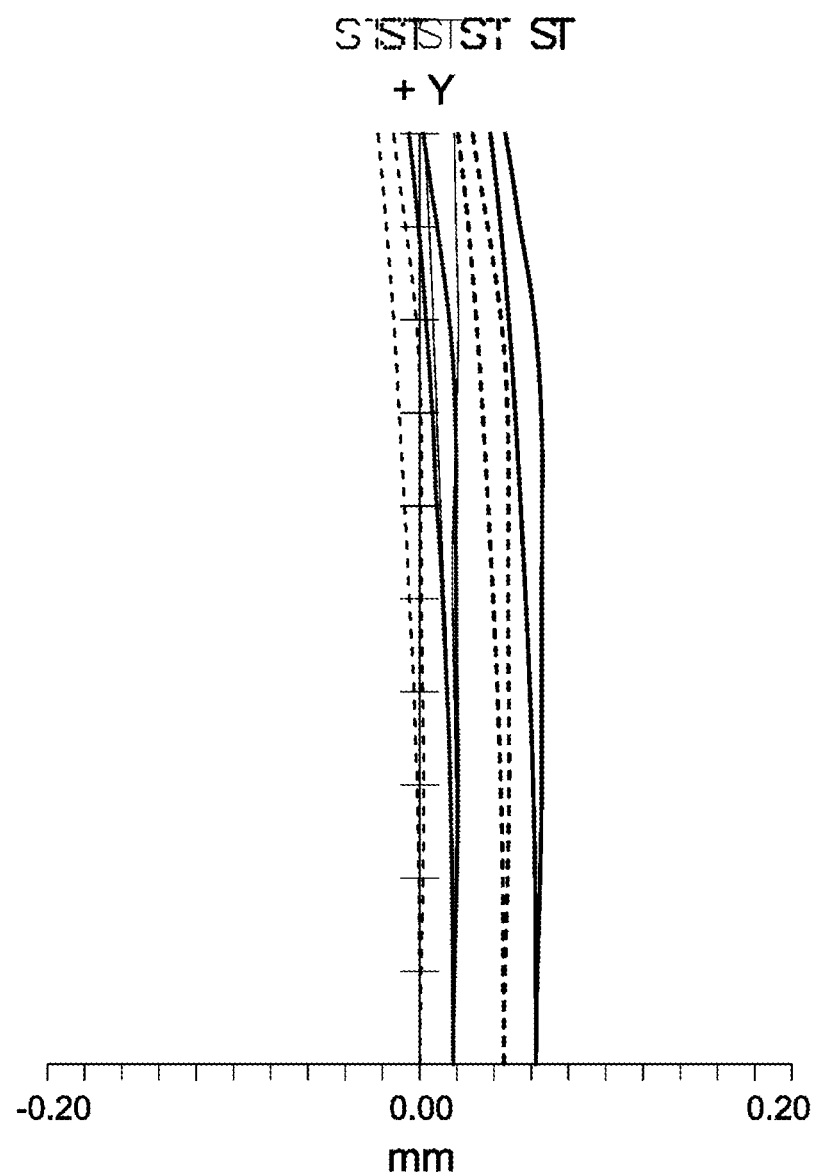
FIG. 8A depicts a field curvature diagram of the lens assembly in accordance with the fourth embodiment of the invention.
Figure 8B:
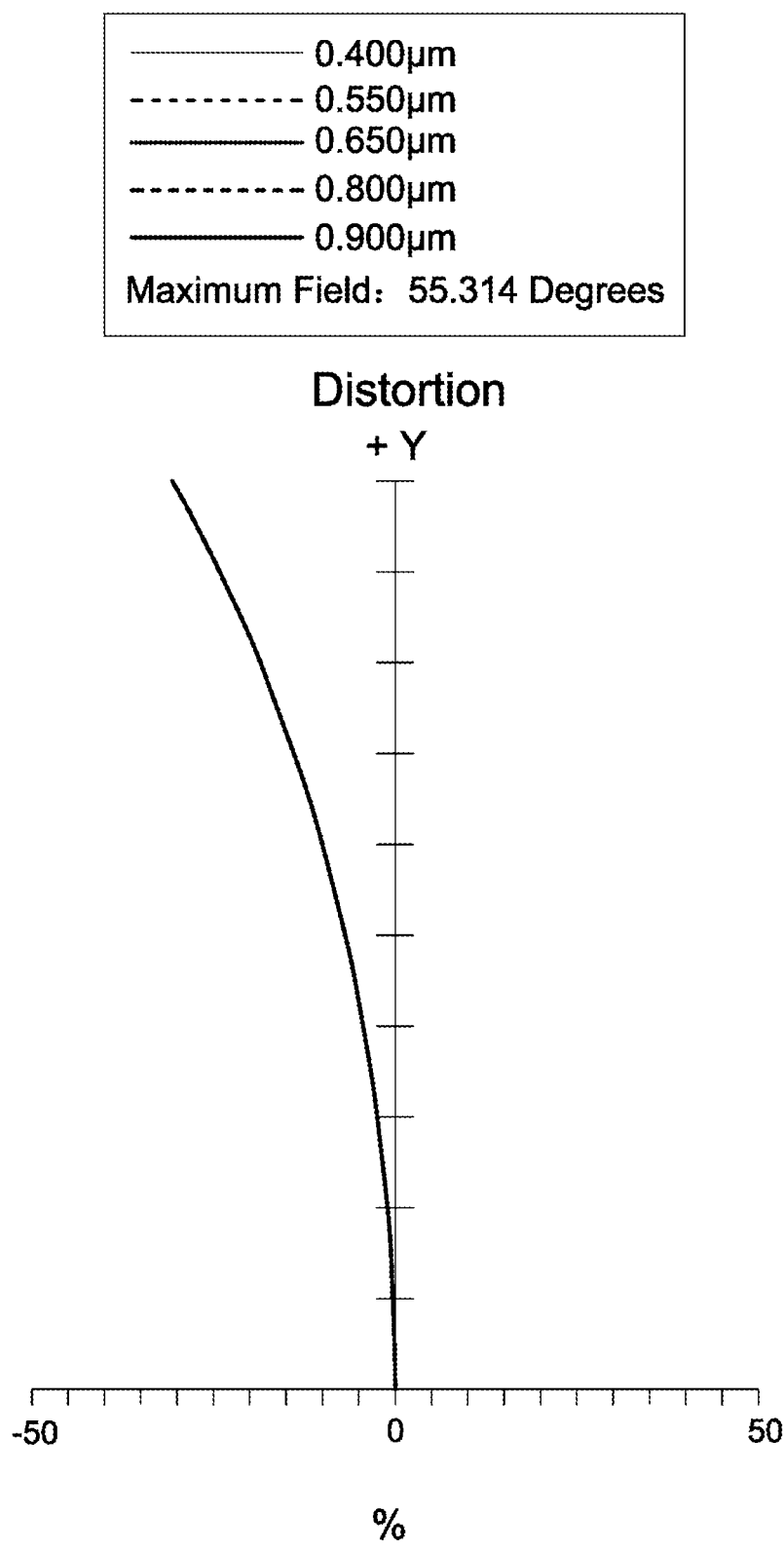
FIG. 8B is a distortion diagram of the lens assembly in accordance with the fourth embodiment of the invention.
Figure 8C:
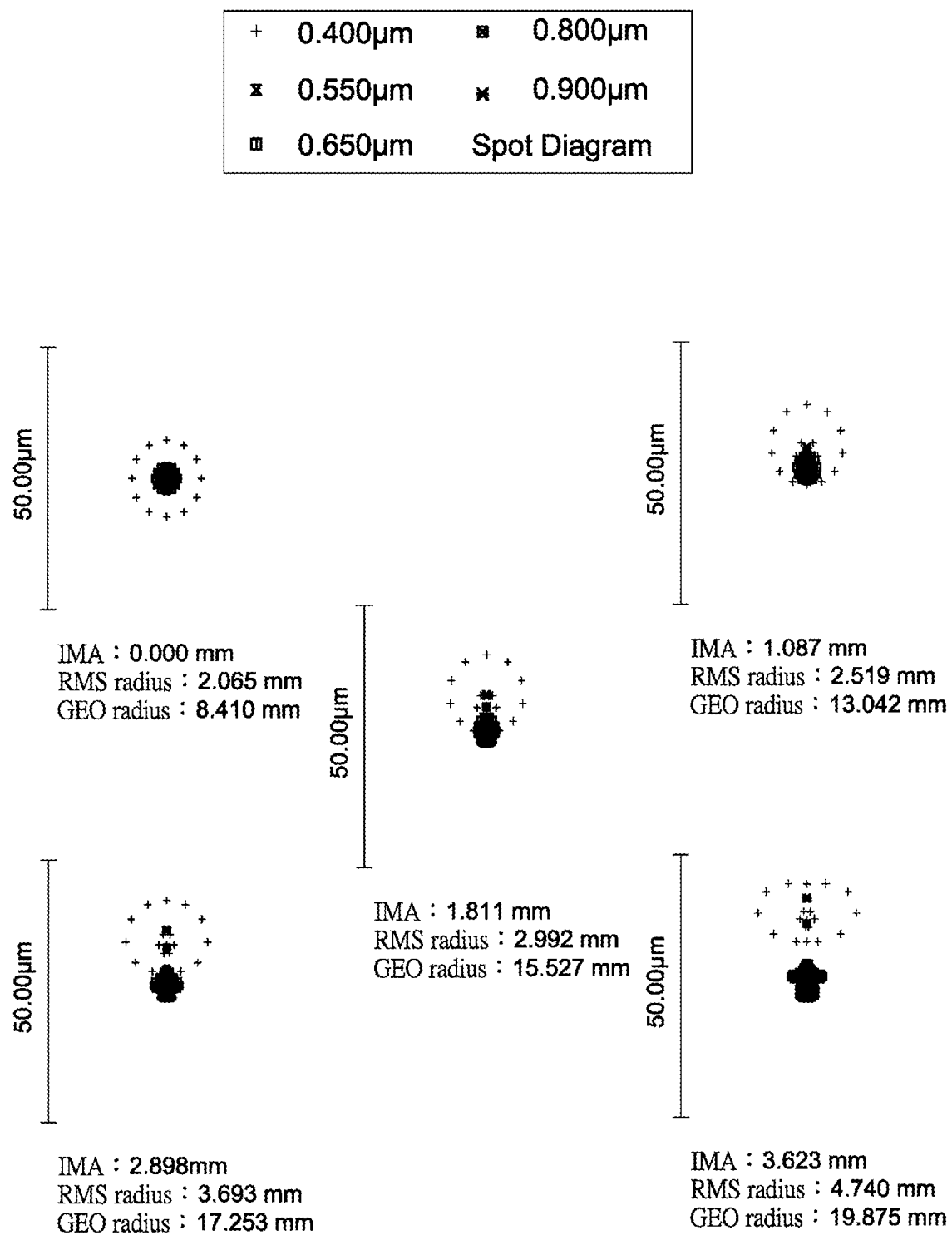
FIG. 8C is a spot diagram of the lens assembly in accordance with the fourth embodiment of the invention.

By the above arrangements of the lenses and stop ST4 the lens assembly 4 of the fourth embodiment can meet the requirements of optical performance. It can be seen from FIG. 8A that the field curvature of tangential direction and sagittal direction in the lens assembly 4 of the fourth embodiment ranges from −0.04 mm to 0.08 mm. It can be seen from FIG. 8B that the distortion in the lens assembly 4 of the fourth embodiment ranges from −35% to 0%. It can be seen from FIG. 8C that the root mean square spot radius is equal to 2.065 μm and geometrical spot radius is equal to 8.410 μm as image height is equal to 0.000 mm, the root mean square spot radius is equal to 2.519 μm and geometrical spot radius is equal to 13.042 μm as image height is equal to 1.087 mm, the root mean square spot radius is equal to 2.992 μm and geometrical spot radius is equal to 15.527 μm as image height is equal to 1.811 mm, the root mean square spot radius is equal to 3.693 μm and geometrical spot radius is equal to 17.253 μm as image height is equal to 2.898 mm, and the root mean square spot radius is equal to 4.740 μm and geometrical spot radius is equal to 19.875 μm as image height is equal to 3.623 mm for the lens assembly 4 of the fourth embodiment. It can be seen from FIG. 8D that the through focus modulation transfer function of tangential direction and sagittal direction in the lens assembly 4 of the fourth embodiment ranges from 0.0 to 0.76 as focus shift ranges from −0.05 mm to 0.05 mm. It is obvious that the field curvature and the distortion of the lens assembly 4 of the fourth embodiment can be corrected effectively, and the depth of focus of the lens assembly 4 of the fourth embodiment can meet the requirement. Therefore, the lens assembly 4 of the fourth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is a meniscus lens with negative refractive power and comprises a convex surface facing an object side, and a concave surface facing an image side;
    a second lens which is with negative refractive power;
    a third lens which is with positive refractive power and comprises a convex surface facing the image side;
    a stop;
    a fourth lens which is with positive refractive power and comprises a convex surface facing the image side;
    a fifth lens which is with positive refractive power and comprises a convex surface facing the object side;
    a sixth lens which is a biconcave lens with negative refractive power and comprises a concave surface facing the object side, and another concave surface facing the image side; and
    a seventh lens which is with positive refractive power and comprises a convex surface facing the image side;
    wherein the first lens, the second lens, the third lens, the stop, the fourth lens, the fifth lens, the sixth lens, and the seventh lens are arranged in order from the object side to the image side along an optical axis;
    wherein the lens assembly satisfies:

$11.3 \leq TTL/BFL \leq 5.3$;

Wherein TTL is an interval in mm from the convex surface of the first lens to an image plane along the optical axis and BFL is an interval in mm from the convex surface of the seventh lens to the image plane along the optical axis;

wherein the lens assembly further satisfies at least one of the following conditions:

$-1 \leq (R41+R42)/(R41-R42) \leq 0$;

$15.5 \leq TTL/f \leq 11.5$;

$-3.5 \leq f1/f \leq -2.4$;

$3 \leq f3/f \leq 6$;

$2.5 \leq f7/f \leq 5.2$;

$17.4 \leq f+f3 \leq 23.8$;

wherein R41 is a radius of curvature of the object side surface of the fourth lens, R42 is a radius of curvature of the convex surface of the fourth lens, TTL is the interval in mm from the convex surface of the first lens to the image plane along the optical axis, f is an effective focal length in mm of the lens assembly, f1 is an effective focal length in mm of the first lens, f3 is an effective focal length in mm of the third lens, and f7 is an effective focal length in mm of the seventh lens.

2. The lens assembly as claimed in claim 1, wherein the second lens comprises a concave surface facing the image side.

3. The lens assembly as claimed in claim 1, wherein the fifth lens further comprises another convex surface facing the image side.

4. The lens assembly as claimed in claim 1, wherein:
the fourth lens further comprises another convex surface facing the object side; and
the seventh lens further comprises another convex surface facing the object side.

5. The lens assembly as claimed in claim 1, wherein the second lens comprises a concave surface or a convex surface facing the object side.

6. The lens assembly as claimed in claim 1, wherein the third lens comprises a plane surface facing the object side.

7. The lens assembly as claimed in claim 1, wherein the third lens comprises another convex surface or a concave surface facing the object side.

8. The lens assembly as claimed in claim 1, wherein the fifth lens and the sixth lens are cemented.

9. A lens assembly comprising:
a first lens which is a meniscus lens with refractive power and comprises a convex surface facing an object side, and a concave surface facing an image side;
a second lens which is with negative refractive power;
a third lens which is with positive refractive power and comprises a convex surface facing the image side;
a stop;
a fourth lens which is with refractive power and comprises a convex surface facing the image side;
a fifth lens which is with positive refractive power and comprises a convex surface facing the object side;
a sixth lens which is a biconcave lens with negative refractive power and comprises a concave surface facing the object side, and another concave surface facing the image side; and
a seventh lens which is with refractive power and comprises a convex surface facing the image side;
wherein the first lens, the second lens, the third lens, the stop, the fourth lens, the fifth lens, the sixth lens, and the seventh lens are arranged in order from the object side to the image side along an optical axis;

wherein the lens assembly satisfies one of the following conditions:

$17.4 \leq f+f3 \leq 23.8$;

$-1 \leq (R41+R42)/(R41-R42) \leq 0$;

wherein f is an effective focal length in mm of the lens assembly, f3 is an effective focal length in mm of the third lens, R41 is a radius of curvature of the object side surface of the fourth lens, and R42 is a radius of curvature of the convex surface of the fourth lens;

wherein the lens assembly further satisfies one of the following conditions:

$8.5 \leq TTL/f \leq 11.5$;

$2.5 \leq f7/f \leq 5.2$;

wherein TTL is an interval in mm from the convex surface of the first lens to an image plane along the optical axis, f is the effective focal length in mm of the lens assembly, and f7 is an effective focal length in mm of the seventh lens;
wherein the first lens is with negative refractive power;
wherein the fourth lens is with positive refractive power;
wherein the seventh lens is with positive refractive power.

10. The lens assembly as claimed in claim 9, wherein:
the fourth lens further comprises another convex surface facing the object side;
the fifth lens further comprises another convex surface facing the image side; and
the seventh lens further comprises another convex surface facing the object side.

11. The lens assembly as claimed in claim 10, wherein the second lens comprises a concave surface facing the object side.

12. The lens assembly as claimed in claim 10, wherein the second lens comprises a convex surface facing the object side.

13. The lens assembly as claimed in claim 10, wherein the third lens comprises another convex surface facing the object side.

14. The lens assembly as claimed in claim 10, wherein the third lens comprises a concave surface facing the object side.

15. The lens assembly as claimed in claim 1, wherein the fifth lens and the sixth lens are cemented.

16. The lens assembly as claimed in claim 15, wherein the seventh lens is an aspheric lens.

17. A lens assembly comprising:
a first lens which is a meniscus lens with negative refractive power and comprises a convex surface facing an object side, and a concave surface facing an image side;
a second lens which is with negative refractive power;
a third lens which is with positive refractive power and comprises a convex surface facing the image side;
a stop;
a fourth lens which is with positive refractive power and comprises a convex surface facing the object side and a convex surface facing the image side;
a fifth lens which is with positive refractive power and comprises a convex surface facing the object side and a convex surface facing the image side;
a sixth lens which is a biconcave lens with negative refractive power and comprises a concave surface facing the object side, and another concave surface facing the image side; and
a seventh lens which is with positive refractive power and comprises a convex surface facing the object side and a convex surface facing the image side;

wherein the first lens, the second lens, the third lens, the stop, the fourth lens, the fifth lens, the sixth lens, and the seventh lens are arranged in order from the object side to the image side along an optical axis;

wherein the lens assembly satisfies one of the following conditions:

$$-3.5 \leq f1/f \leq -2.4;$$

$$3 \leq f3/f \leq 6;$$

wherein f is an effective focal length in mm of the lens assembly, f1 is an effective focal length in mm of the first lens, and f3 is an effective focal length in mm of the third lens.

* * * * *